US010575329B2

(12) United States Patent
Salem et al.

(10) Patent No.: US 10,575,329 B2
(45) Date of Patent: Feb. 25, 2020

(54) METHOD AND SYSTEM FOR ACCESS TO UNLICENSED SPECTRUM BY TRANSMIT POINTS

(71) Applicant: Huawei Technologies Co., Ltd., Shenzhen (CN)

(72) Inventors: Mohamed Adel Salem, Kanata (CA); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/411,629

(22) Filed: Jan. 20, 2017

(65) Prior Publication Data

US 2018/0124834 A1 May 3, 2018

Related U.S. Application Data

(63) Continuation of application No. PCT/CN2016/103873, filed on Oct. 29, 2016.

(51) Int. Cl.
*H04W 74/08* (2009.01)
*H04W 72/04* (2009.01)
(Continued)

(52) U.S. Cl.
CPC ... *H04W 74/0816* (2013.01); *H04W 72/0446* (2013.01); *H04W 74/006* (2013.01);
(Continued)

(58) Field of Classification Search
CPC ............ H04W 72/0446; H04W 74/08; H04W 74/0816; H04W 88/08; H04W 84/12;
(Continued)

(56) References Cited

U.S. PATENT DOCUMENTS 6,006,271 A * 12/1999 Grabiec ............... H04L 12/413
370/229
2014/0341018 A1* 11/2014 Bhushan ........... H04W 28/0289
370/230
(Continued)

FOREIGN PATENT DOCUMENTS

CN 104717686 A 6/2015
CN 104812032 A 7/2015
(Continued)

OTHER PUBLICATIONS

3GPP TS 36.213, 3rd Generation Partnership Project; Technical Specification Group Radio Access Network; Evolved Universal Terrestrial Radio Access (E-UTRA); Physical layer procedures (Release 14), V14.0.0, Sep. 2016, 406 pages.

*Primary Examiner* — Rownak Islam
(74) *Attorney, Agent, or Firm* — Slater Matsil, LLP

(57) ABSTRACT

Methods and systems for access to unlicensed spectrum are described. Each of one or more transmit points (TPs), transmit over an unlicensed spectrum a downlink transmission starting at a downlink transmission starting time after a successful clear channel assessment (CCA) process of each of the one or more TPs. For each of the one or more TPs, the successful CCA process has a CCA process starting time enabling the successful CCA process to be completed at the downlink transmission starting time. The one or more TPs may be licensed assisted access (LAA) TPs, and the starting time corresponds to a starting time of a licensed spectrum subframe.

21 Claims, 11 Drawing Sheets

(51) Int. Cl.
*H04W 74/00* (2009.01)
*H04W 84/12* (2009.01)
*H04W 88/08* (2009.01)
*H04W 88/12* (2009.01)

(52) U.S. Cl.
CPC ............ *H04W 84/12* (2013.01); *H04W 88/08* (2013.01); *H04W 88/12* (2013.01)

(58) Field of Classification Search
CPC . H04W 74/006; H04W 72/044; H04W 88/12; H04W 74/0808; H04W 16/14
USPC ......................................................... 370/338
See application file for complete search history.

(56) References Cited

U.S. PATENT DOCUMENTS

| | | | | |
|---|---|---|---|---|
| 2015/0282045 | A1* | 10/2015 | Salem | H04W 40/10 |
| | | | | 370/329 |
| 2016/0094998 | A1 | 3/2016 | Bhushan et al. | |
| 2017/0111874 | A1* | 4/2017 | Harada | H04L 5/001 |
| 2017/0202018 | A1* | 7/2017 | Cha | H04W 74/0816 |
| 2017/0231006 | A1* | 8/2017 | Yin | H04W 74/0816 |
| 2017/0310422 | A1* | 10/2017 | Baker | H04L 1/0025 |
| 2017/0325225 | A1* | 11/2017 | Dinan | H04W 72/0446 |
| 2018/0124749 | A1* | 5/2018 | Park | H04W 72/042 |
| 2018/0139775 | A1* | 5/2018 | Ahn | H04W 72/14 |
| 2018/0220459 | A1* | 8/2018 | Park | H04L 1/18 |

FOREIGN PATENT DOCUMENTS

| | | |
|---|---|---|
| CN | 105991497 A | 10/2016 |
| EP | 3249963 A1 | 11/2017 |
| WO | 2016117608 A1 | 7/2016 |
| WO | 2016169399 A1 | 10/2016 |

* cited by examiner

METHOD AND SYSTEM FOR ACCESS TO UNLICENSED SPECTRUM BY TRANSMIT POINTS

CROSS-REFERENCE TO RELATED APPLICATIONS

This application is a continuation of PCT Application No. PCT/CN2016/103873, filed on Oct. 29, 2016, which application is hereby incorporated herein by reference.

TECHNICAL FIELD

The present application relates to mobile air interface technologies, in particular to methods and systems for access to unlicensed spectrum by transmit points (TPs).

BACKGROUND

There is ongoing interest in increasing the use of unlicensed spectrum. There is special interest in aggregating unlicensed spectrum to licensed spectrum, in order to increase resources of a network when needed. Licensed assisted access (LAA) allows access to unlicensed spectrum via unlicensed component carrier, with assistance from primary component carriers (PCC) operating on licensed spectrum. LAA aims to port the Mobile Broadband (MBB) air interface to the unlicensed spectrum through aggregating unlicensed component carriers (CCs) at the operator's small cells. Small cells (also referred to as low power nodes (LPNs)) are low-powered radio access nodes that may operate in both the licensed and unlicensed spectrum, and have a relatively short coverage range (e.g., within 200 m from antenna(s) of the small cell). The 5 GHz unlicensed spectrum, in which WLAN is a prominent incumbent, is of special interest.

It is important for a technology, such as LAA, to access unlicensed spectrum in a fair and efficient manner, so that satisfactory intra-operator or inter-operators coexistence performance as well as satisfactory coexistence performance with incumbent WLAN may be achieved. With the envisioned dense deployments and/or high channel occupancy of WLAN, e.g., IEEE802.11ac, and LAA networks, it is more challenging to attain coexistence fairness.

SUMMARY

Some existing technologies transmit a blocking signal or use a deferring time period between a clear channel assessment (CCA) process completing time and a downlink transmission starting time, and unlicensed spectrum is not used for downlink transmission during this period. As well, other TPs of WLAN or other LAA groups may start downlink transmission during the deferring time period and thus cause downlink transmission collisions. In addition, some existing technologies have aggressive schemes to access unlicensed spectrum.

The present disclosure describes methods and systems for access to unlicensed spectrum by at least a transmit point (TP). An objective of embodiments of the present disclosure is to access unlicensed spectrum in an efficient manner. In embodiments of the present application, optional objectives may also include to avoid downlink transmission collisions, and/or, to improve coexistence fairness with other radio access technologies.

According to one embodiment, the present disclosure describes a method for downlink transmission via unlicensed spectrum by one or more transmit points (TPs), the method comprising: transmitting over the unlicensed spectrum, by each of the one or more TPs, a downlink transmission starting at a downlink transmission starting time after a successful clear channel assessment (CCA) process, wherein for each of the one or more TP's the successful CCA process has a CCA process starting time enabling the successful CCA process to be completed at the downlink transmission starting time.

According to one embodiment, the one or more TPs are licensed assisted access (LAA) TPs, and wherein the common starting time corresponds to a starting time of a licensed spectrum subframe.

According to one embodiment, the one or more TPs are associated with a controller. The method further comprises transmitting to the controller, by each of the TPs, a respective message indicating a respective first downlink transmission starting time of the TP, wherein the common downlink transmission starting time accommodates the respective first downlink transmission starting times of the TPs.

According to one embodiment, the method further comprises transmitting to the controller, by each of the TPs, a respective message indicating a respective first downlink transmission starting time of the TP, and aligning, by each of the TPs, to the common downlink transmission starting time which accommodates the respective first downlink transmission starting times of the TPs.

According to one embodiment, the present disclosure describes a method for access to unlicensed spectrum by one or more transmit points (TPs) associated with a controller, the method comprising: transmitting, by the controller, to each of the TPs, the common downlink transmission starting time, wherein each of the TPs is configured to: transmit over the unlicensed spectrum, by each of the one or more TPs, a downlink transmission starting at a downlink transmission starting time after a successful clear channel assessment (CCA) process, wherein for each of the each of the one or more TP's, the successful CCA process has a CCA process starting time enabling the respective successful CCA process to be completed at the common downlink transmission starting time.

According to one embodiment, the method further comprises receiving, by the controller, length information of a downlink to be transmitted by each of the plurality of TPs, and transmitting to the TPs, by the controller, a second common contention window (CW) size value and a second common downlink transmission starting time.

According to one embodiment, the present disclosure describes a method for access to unlicensed spectrum by one or more transmit points (TPs) associated with a controller, the method comprising receiving from each of the one or more TPs, by the controller, a downlink transmission starting time, and transmitting, by the controller, to each of the one or more TPs, a common downlink transmission starting time, when the downlink transmission starting time is different from the common downlink transmission starting time, wherein each of the TPs is configured to: transmit over the unlicensed spectrum, by each of the one or more TPs, a downlink transmission starting at a downlink transmission starting time after a successful clear channel assessment (CCA) process, wherein for each of the each of the one or more TP's, the successful CCA process has a CCA process starting time enabling the respective successful CCA process to be completed at the common downlink transmission starting time.

According to one embodiment, the present disclosure describes a transmission point (TP) for access to unlicensed spectrum, the TP comprising a processor configured to execute instructions that cause the TP to transmit over the unlicensed spectrum, by the TP, a downlink transmission starting at a downlink transmission starting time after a successful clear channel assessment (CCA) process of the TP, wherein the successful CCA process has a CCA process starting time enabling the successful CCA process to be completed at the downlink transmission starting time.

According to one embodiment, the TP is a licensed assisted access (LAA) TP, and wherein the starting time corresponds with a starting time of a licensed spectrum subframe.

According to one embodiment, the present disclosure describes a controller associated with one or more transmission points (TPs) for the TPs to access to unlicensed spectrum, the controller comprising a processor configured to execute instructions that cause the controller to transmit, to each of the one or more TPs, a downlink transmission starting time, wherein each of the TPs is configured to: transmit over the unlicensed spectrum, by each of the one or more TPs, a downlink transmission starting at a downlink transmission starting time after a successful clear channel assessment (CCA) process, wherein for each of the one or more TPs, the successful CCA process has a CCA process starting time enabling the respective successful CCA process to be completed at the downlink transmission starting time.

According to one embodiment, the processor is further configured to execute instructions that cause the controller to: transmit, to each of the TPs, common contention window (CW) size value, the CW size value corresponding with a random contention duration of the CCA process of the TPs.

According to one embodiment, the TP completes a CCA process at a downlink transmission starting time without a deferring time period or a blocking signal between the CCA completing time and the downlink transmission starting time. Potential collisions of downlink transmission between the TP and TPs of WLAN or other LAA groups may be avoided, and the unlicensed spectrum may be accessed in a more efficient manner.

BRIEF DESCRIPTION OF THE DRAWINGS

Reference will now be made, by way of example, to the accompanying drawings which show example embodiments of the present application, and in which.

Similar reference numerals may have been used in deferent figures to denote similar components. While aspects of the invention will be described in conjunction with the illustrated embodiments, it will be understood that it is not intended to limit the invention to such embodiments.

DETAILED DESCRIPTION OF ILLUSTRATIVE EMBODIMENTS

Figure 1:
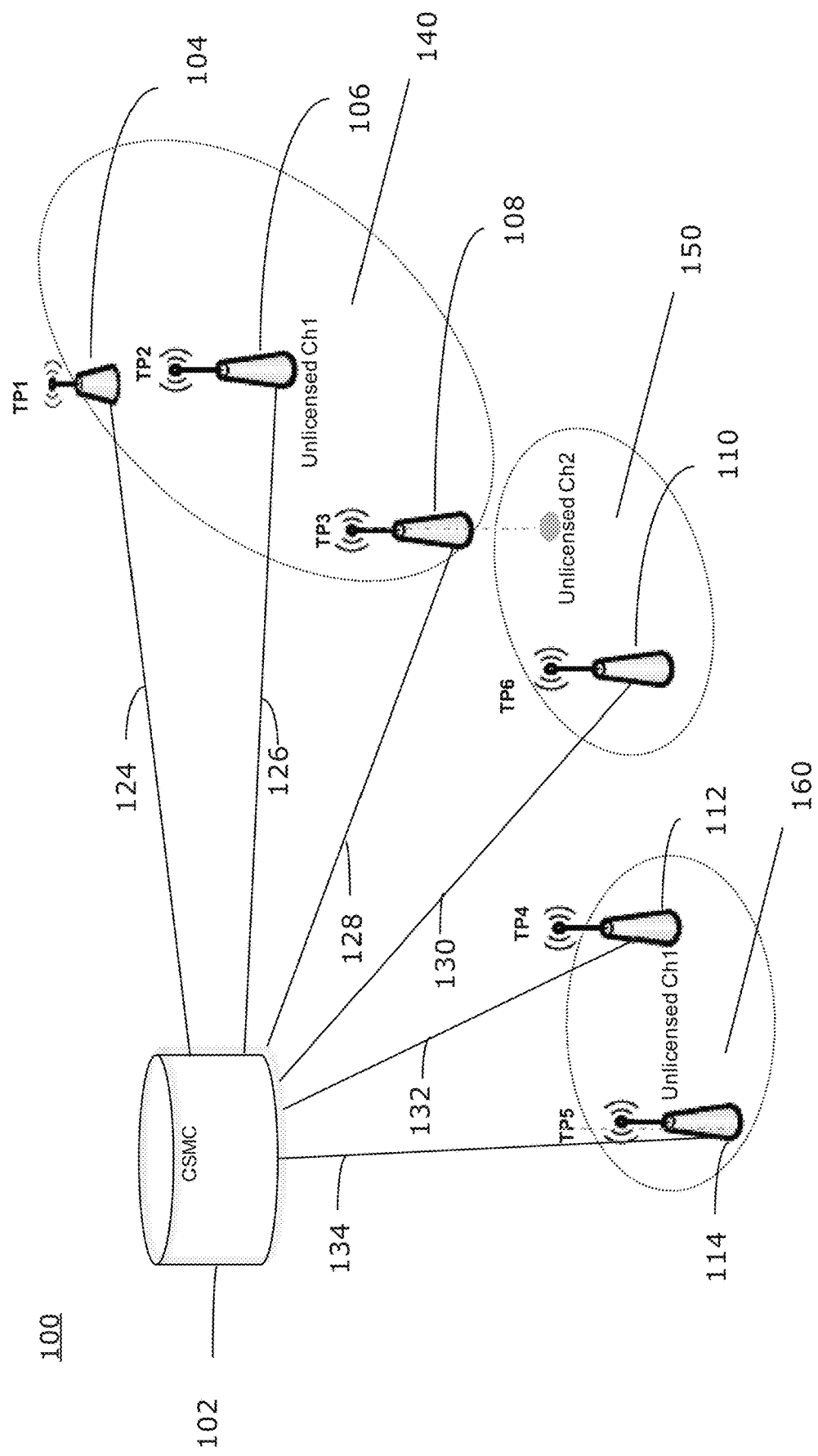
FIG. 1 is a block diagram illustrating an example communications system in accordance with one implementation of the present disclosure.

The present disclosure teaches methods and systems for access to unlicensed spectrum. While described below primarily with respect to LAA networks, the present disclosure may also be applied to other networks operating on unlicensed spectrum.

Listen-Before-Talk (LBT) mechanism may be used for access to unlicensed spectrum. A TP may access to a medium (also referred as an unlicensed spectrum channel) to transmit its downlink transmission, such as downlink bursts, when the medium is declared by the TP to be available or idle for a predefined period, such as a clear channel assessment (CCA) period. A downlink transmission, such as a downlink burst, may include user data and/or signaling data.

The LBT mechanism in Release 13 of 3GPP standard relies only on energy detection (ED) to determine the availability of the medium. This LBT mechanism is more aggressive than the carrier sense multiple access with collision avoidance mechanism (CSMA/CA) currently used by WLAN. In addition to ED, the CSMA/CA of WLAN would be 20 dB more sensitive in detecting the presence of other WLAN signals through Physical Carrier sense and MAC Carrier sense.

As well, synchronous access by LAA TPs is desired to simplify LAA interference measurement and management. In particular, synchronous access by LAA TPs may help address intra-LAA operator "exposed node" problem for improved spectral efficiency. The "exposed node" problem occurs where two neighboring LAA TPs operating independently, while not interfering with each other, one may nonetheless block the other's access to the medium when a station (STA) or user equipment (UE) within the overlapping coverage areas of the two TPs communicates with one of the TPs. The medium may refer to unlicensed spectrum or an unlicensed spectrum channel. The other TP may perceive that the medium is busy when the TP senses the presence of other WLAN signals on the medium. When the medium is perceived busy by the TP, the TP considers that the medium becomes unavailable at its downlink transmission starting time. When the two TPs are grouped together, such as in the same group or radio access cluster (RAC), the TPs may access the medium as one group. If the group of the TPs access to the medium at the same starting time, i.e., synchronously, a first TP would not block the second TP's access to the medium when the STA or UE within the overlapping coverage areas of the first and second TPs communicates with the first TP as the second TP has already started transmitting over the medium.

Synchronous access by LAA TPs may also provide more effective protection from "hidden nodes" co-channel interference. The "hidden nodes" problem occurs where a WLAN node within the coverage area of a first LAA TP may not be known to a neighboring second LAA TP. However, the WLAN node may still interfere with transmissions by the second TP if the WLAN node is communicating with a STA or UE within an overlapping coverage area of the first and second TPs. By grouping the first and second TPs together as a single group or RAC, information about the WLAN node from the first TP may be taken into account when a controller determines transmissions from both the first and second TPs. In this way, the second TP may benefit from information received from the first TP when both TPs are grouped into the same RAC and when the TPs transmit bursts at the same starting time.

FIG. 1 illustrates an example system 100 in which examples described herein may be implemented. The system 100 may be used in an LAA network.

In the example system 100, a controller manages operation of a plurality of TP groups, such as RACs, for example, TP groups 140, 150, and 160. In an embodiment, the controller may be a central spectrum management control unit (CSMC) 102. A CSMC 102 is a network logical controller, which may be hosted by a Macro eNB or a TP connected to the TPs of a group. The CSMC 102 may define one or more RACs for the TPs managed by the CSMC 102. Each RAC may be channel-specific—that is, each RAC may be defined to use an unlicensed spectrum channel that is different from an adjacent RAC. The mechanisms to group TPs into disjoint groups or RACs is described in U.S. application Ser. No. 14/869,617, which is incorporated into this application by reference.

Each group or RAC may include one or more TPs and each TP may belong to one or more groups or RACs. For example, TP 108 in FIG. 1 belongs to both group 140 and group 150. Each TP provides unlicensed spectrum access for one or more devices, such as UEs or STAs. A TP may also be an eNB. In the example of FIG. 1, TP group 140 may comprise TP1 104, TP2 106, and TP3 108; TP group 150 may comprise TP3 108 and TP6 no; and TP group 160 may comprise TP4 112 and TP5 114.

Each TP of a TP group may connect to the CSMC 102 via at least one communication link, for example, a backhaul connection link, such as backhaul connection links 124, 126, 128, 130, 132, or 134. Message between the TPs and the CSMC 102 may be exchanged via communication links. The communication links may be wireless communication link, such as microwave links, or wired links, such as optical fiber links. The CSMC 102 may manage the TPs via one or more communication links.

Synchronous access of TPs, including LAA TPs, is desired to opportunistically achieve a reuse factor of one. As shown in TP groups 140, 150 and 160, TP group 140 may use unlicensed spectrum channel 1, TP group 150 may use unlicensed spectrum channel 2, and TP group 160, the coverage area of which does not overlap with that of the TP group 140, may reuse unlicensed spectrum channel 1. Grouping TPs into a group allows the same unlicensed channel to be used by all of the TPs of the TP group. As such, a reuse factor of one of the TPs within a TP group may be achieved. With respect to a TP belonged to more than one TP groups, the TP uses the unlicensed spectrum channel assigned to the specific TP group when the TP operates as a member of the TP group. For example, when TP 108 of FIG. 1 operates as a member TP of TP group 140, TP3 108 uses the unlicensed channel assigned to TP group 140, namely, the unlicensed channel 1; and when TP 108 operates as a member TP of TP group 150, TP3 108 uses the unlicensed spectrum channel assigned to group 150, namely, the unlicensed spectrum channel 2.

Although FIG. 1 only illustrates one CSMC 102, multiple CSMCs may be used to manage a plurality TPs. The CSMCs may be interconnected via backhaul connection links or interfaces, such as X2. As well, the numbers of TPs of each TP group managed by the CSMC 102 may also be varied.

Figure 2:
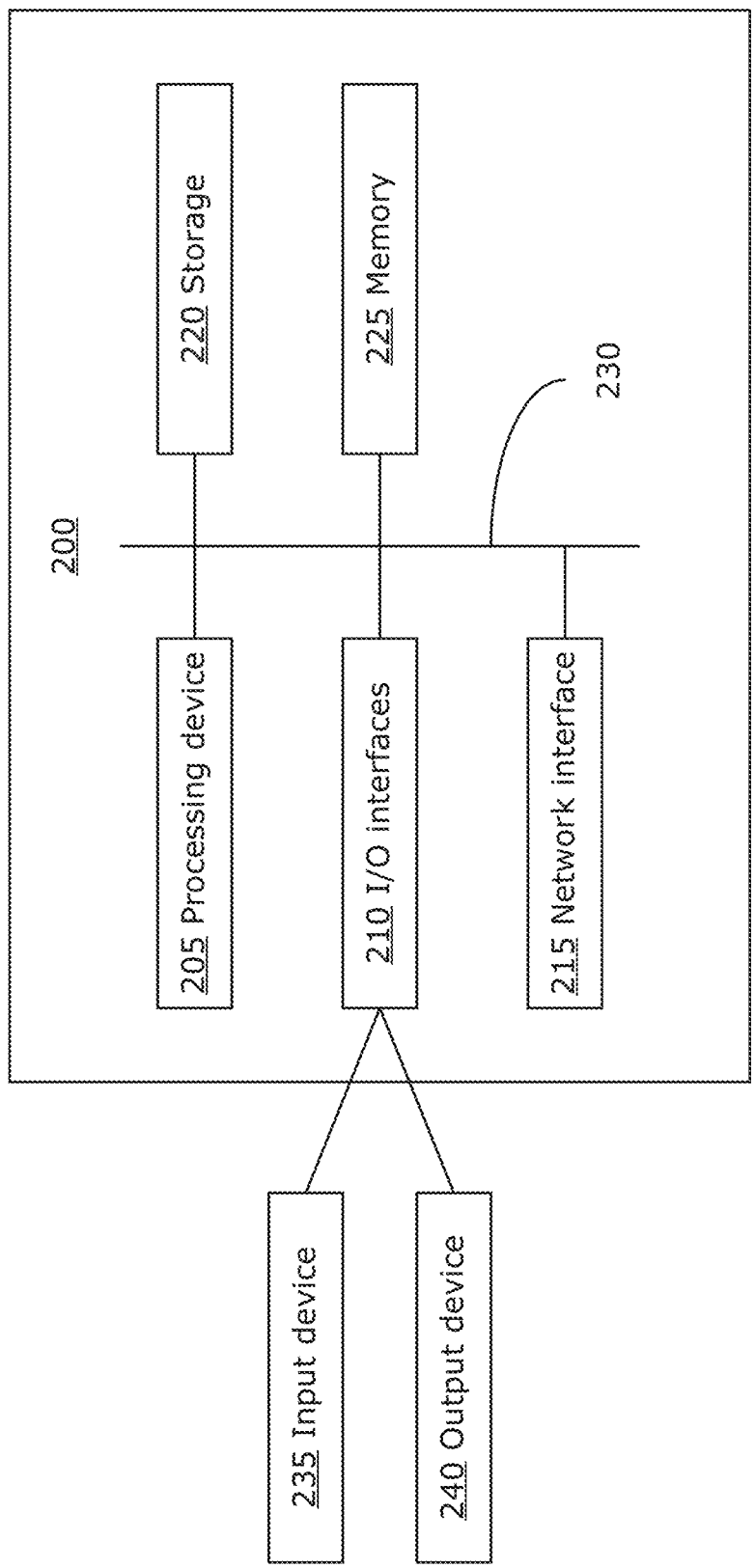
FIG. 2 is a block diagram illustrating an example processing system in accordance with one implementation of the present disclosure.

FIG. 2 is a block diagram of an example processing system 200, which may be used to implement the methods and systems disclosed herein. The processing system 200 may be a component of a CSMC, an eNB, or a TP. Other processing systems suitable for implementing the present disclosure may also be used, which may include components deferring from those discussed below. Although FIG. 2 shows a single instance of each component, there may be multiple instances of each component in the processing system 200.

The processing system 200 may include one or more processing devices 205, such as a processor, a microprocessor, an application-specific integrated circuit (ASIC), a field-programmable gate array (FPGA), a dedicated logic circuitry, or combinations thereof. The processing system 200 may also include one or more input/output (I/O) interfaces 210, which may enable interfacing with one or more appropriate input devices 235 and/or output devices 240. The processing system 200 may include one or more network interfaces 215 for wired or wireless communication with a network (e.g., a wireless core network, an intranet, the Internet, a P2P network, a WAN and/or a LAN). The network interface(s) 215 may include wired links (e.g., Ethernet cable, or fiber optical links) and/or wireless links (e.g., one or more microwave links, or satellite links) for intra-network and/or inter-network communications. The network interface(s) 215 may provide wireless communication via one or more transmitters or transmitting antennas and one or more receivers or receiving antennas, for example. The processing system 200 may also include one or more storage units 220, which may include a mass storage unit such as a solid state drive, a hard disk drive, a magnetic disk drive and/or an optical disk drive.

The processing system 200 may include one or more memories 225, which may include a volatile or non-volatile memory (e.g., a flash memory, a random access memory (RAM), and/or a read-only memory (ROM)). The non-transitory memory(ies) 225 may store instructions for execution by the processing device(s) 205, such as to carry out examples described herein. The memory(ies) 225 may include other software instructions, such as for implementing an operating system and other applications/functions. In some examples, one or more data sets and/or module(s) may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 230 providing communication among components of the processing system 200, including the processing device(s) 205, I/O interface(s) 210, network interface(s) 215, storage unit(s) 220 and/or memory(ies) 225. The bus 230 may be any suitable bus architecture including, for example, a memory bus, a peripheral bus or a video bus.

In FIG. 2, the input device(s) 235 (e.g., a keyboard, a mouse, a microphone, a touchscreen, and/or a keypad) and output device(s) 240 (e.g., a display, a speaker and/or a printer) are shown as external to the processing system 200. In other examples, one or more of the input device(s) 235 and/or the output device(s) 240 may be included as a component of the processing system 200.

Figure 3A:
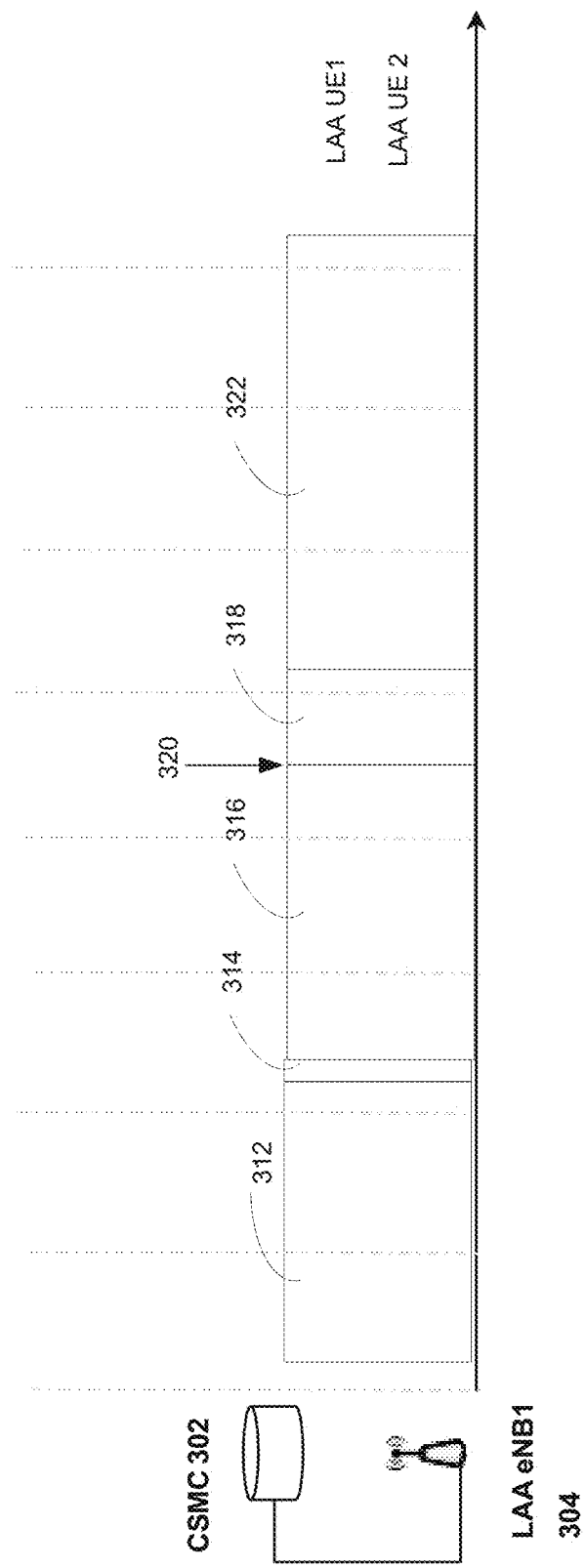
FIG. 3A is a diagram illustrating a mechanism for access to unlicensed spectrum by a single LAA eNB.

FIG. 3A illustrates a category 4 LBT mechanism for a single LAA eNB to access a medium. In FIG. 3A, a TP group is associated with a CSMC 302, and an LAA eNB1 304. The CSMC 302 is connected to the eNB1 304 via a backhaul connection link. The eNB1 304 may provide unlicensed spectrum access to LAA UE1 and LAA UE2. In this example, the eNB1 304 first senses, for example using ED-based CCA, that the medium is busy at period 312. The CCA process includes a DIFS 314 and a random contention duration (CW) 316. The CW 316 is also called an extended CCA process. The eNB1 304 independently generates a random backoff counter value, cws, which corresponds with the CW 316, where CW=cws×a CCA slot duration. For example, a CCA slot duration may be 9 μs. When the status of the medium is continuously idle for a distributed interframe space (DIFS) duration 314, for example 34 μs, the eNB1 304 continues sensing the medium during the CW 316. When the eNB1 304 is sensing the medium during CW 316, the backoff counter value cws decrements by 1 when a CCA slot duration has elapsed, and is decreased to 0 at the completing time of CW 316. In FIG. 3A, the medium remains idle at the completing time of the CW 316. Release 13 of 3GPP requires LAA TPs to align their respective downlink burst transmissions with a starting time of a licensed primary component carrier subframe, or a licensed spectrum subframe, for example the licensed subframe starting time 320. The CSMC 302 determines the downlink burst transmission starting time 320 and communicates the starting time 320 to LAA eNB1 304 via the backhaul connection link, so that LAA eNB1 304 may access to the medium at the starting time 320. According to Release 13 of 3GPP, eNB1 304 transmits a blank blocking or reserving signal for the duration of 318 after the completing time of CW 316 and before the starting time 320 to prevent WLAN or other LAA TPs from accessing the medium. At the starting time 320, which aligns with of a starting time of the licensed primary component carrier subframe, eNB1 304 starts transmitting over the medium its downlink bursts to LAA UE1 and/or LAA UE2 during the duration of 322.

If during the CW 316, the CCA process is terminated due to the medium 'busy' assessment, the remaining backoff counter value cws is frozen to maintain priority in a subsequent medium access attempt of the LAA eNB1 304. For example, if the cws value initially generated by the random backoff counter of the LAA eNB1 304 is 5 CCA slot durations, during the CW 316, the medium becomes busy when the cws value decrements to 3 CCA slot durations. In this case, the random backoff counter of the LAA eNB1 304 is frozen at 3 CCA slot duration. In a subsequent medium access attempt by LAA eNB1 304, the random backoff counter will not generate a new counter value but use the remaining value of 3 CCA slot duration.

Figure 3B:
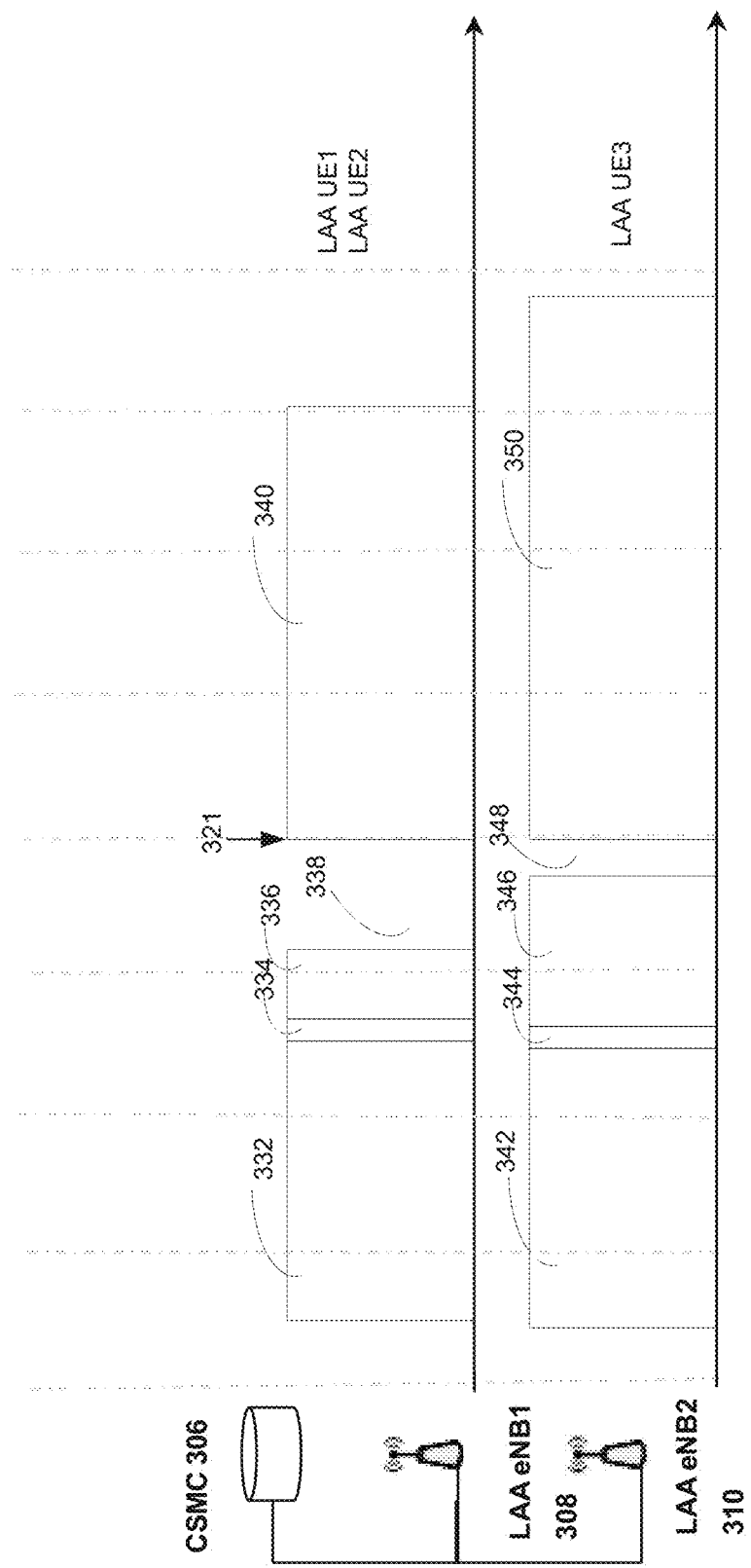
FIG. 3B is a diagram illustrating a mechanism for access to unlicensed spectrum by a group of LAA eNBs.

FIG. 3B illustrates a category 4 LBT mechanism for a group of LAA eNBs to synchronously access a medium. In the example of FIG. 3B, a TP group is associated with a CSMC 306, an LAA eNB1 308 and an LAA eNB2 310. The CSMC 306 is connected to each of LAA eNB1 308 and LAA eNB2 310 via a backhaul connection link. The LAA eNB1 308 may provide unlicensed spectrum access to LAA UE1 and LAA UE2. The LAA eNB1 310 may provide unlicensed spectrum access to LAA UE3. In FIG. 3B, the LAA eNB1 308 and LAA eNB2 310 may first sense, for example using ED-based CCA, that the medium is busy at periods 332 and 342, respectively. The LAA eNB1 308 and LAA eNB2 310 keep sensing the medium. The LAA eNB1 308 and LAA eNB2 310 independently generate respective random backoff counter values cws1 and cws2, which corresponds with CW1 336 and CW2 346, respectively, where CW1=cws1×a CCA slot duration and CW2=cws2×a CCA slot duration. For example, a CCA slot duration may be 9 μs. When the status of the medium is continuously idle for a distributed interframe space (DIFS) a DIFS duration 334 or 344, the eNB1 304 continues sensing the medium during the CW 316. When the LAA eNB1 308 and LAA eNB2 310 are sensing the medium during respective CW1 336 and CW2 346, the respective backoff counter values cws1 and cws2 decrement by 1 when a CCA slot duration has elapsed, and are decreased to 0 at the completing time of CW 316. Similarly, if during the CW1 336 or CW2 346, the CCA process is terminated due to the medium 'busy' assessment, the remaining backoff counter value cws1 or cw2 is frozen to maintain priority in a subsequent medium access attempt of the LAA eNB1 308 or LAA eNB2 310.

CW1 336 and CW2 346 may differ from each other. In the example of FIG. 3B, CW1 336 is shorter than CW2 346. The LAA eNB1 308 and LAA eNB2 310 continuously assess whether the medium is idle during CW1 336 and CW2 346, respectively, using ED-based CCA. Release 13 of 3GPP requires LAA eNB1 308 to align its downlink burst transmissions with a starting time of a licensed primary component carrier subframe at 321, which occurs after both the CW1 period 336 and CW2 period 346 have completed. Therefore, after the completion of a successful CCA period, each of the LAA eNB1 308 and the LAA eNB2 310 defers its downlink burst transmission to a common starting time 321, so that eNB1 308 and eNB2 310 may synchronously access the medium at the common downlink subframe transmission starting time 321. The CSMC 306 determines the common starting time 321 and communicates the common starting time 321 to the LAA eNB1 308 and LAA eNB2 310 via respective backhaul connection links. After the CCA process has been successfully completed but before the starting time 321, LAA eNB1 308 invokes a deferring time period 338 for aligning its downlink burst transmission to the starting time 321. Similarly, LAA eNB2 310 invokes a deferring time period 348 for aligning its transmission of bursts starting at the starting time 321. As such, the LAA eNB1 308 and LAA eNB2 310 may synchronously access the medium at the common starting time 321.

Similar to the example of the LAA eNB1 304 in FIG. 3A, during the CW1 336 or CW2 346 period, if a CCA is terminated due to 'busy' assessment, the remaining backoff counter value cws1 of LAA eNB1 308 or cws2 of LAA eNB2 310 is frozen to maintain the priority in a subsequent access attempt.

During the deferring time periods 338 and 348, neither the LAA eNB1 308 nor the LAA eNB2 310 transmits any signal to notify adjacent TPs of other networks that the LAA eNB1 308 or the LAA eNB2 310 has completed a CCA process. As such, the medium appears to remain idle to TPs of other networks, such as WLAN or other LAA networks. After the deferring time periods 338 and 348, the LAA eNB1 308 and LAA eNB2 310 start transmitting respective downlink bursts to LAA UEs at the common starting time 321 for the durations of 340 and 350, respectively.

In the example of FIG. 3A, the LAA eNB1 304 transmits a blocking signal 318 on the medium to prevents TPs of WLAN or other LAA groups from accessing the medium. However, in the group access mechanism of FIG. 3B, the LAA eNB1 308 or the LAA eNB2 310 in FIG. 3B cannot transmit a blank blocking or reservation signal to prevent TPs of WLAN or other LAA groups from accessing the medium during the deferring time period 338 or 348. In FIG. 3B, after the LAA eNB1 308 has completed its CCA process before the CCA process of the LAA eNB2 310 is completed, if LAA eNB1 308 starts transmitting a blocking signal on the medium, if the LAA eNB2 310 senses the blocking signal, the LAA eNB2 310 may determine that the medium became "busy" and subsequently terminate its CCA process. Therefore, the blocking signal may defeat synchronous access to the medium by a group of TPs.

On the other hand, because during the deferring time periods 338 and 348, the status of the medium is still idle, adjacent TPs of WLAN or other LAA groups that have completed CCA process before the common starting time 321 may access the medium. In other words, during deferring time periods 338 and 348, the status of medium may change from idle to busy. The access of the medium by adjacent TPs of WLAN or other LAA groups prior to the starting time 321 will not cause the LAA eNB1 308 and the LAA eNB2 310 to back off from downlink burst transmissions at the common starting time 321. As such, when the LAA eNB1 308 and the LAA eNB2 310 start transmitting bursts on the downlink of the medium at the common starting time 321, their downlink bursts transmission will inevitably collide with the transmissions of adjacent TPs of WLAN or other LAA groups. Consequently, this collision may cause backoff delays and throughput losses to other co-existing networks, especially WLAN.

Random Contention Window Sizes Generated by TPs

A TP Group with a Controller and One or More TPs

Figure 4:
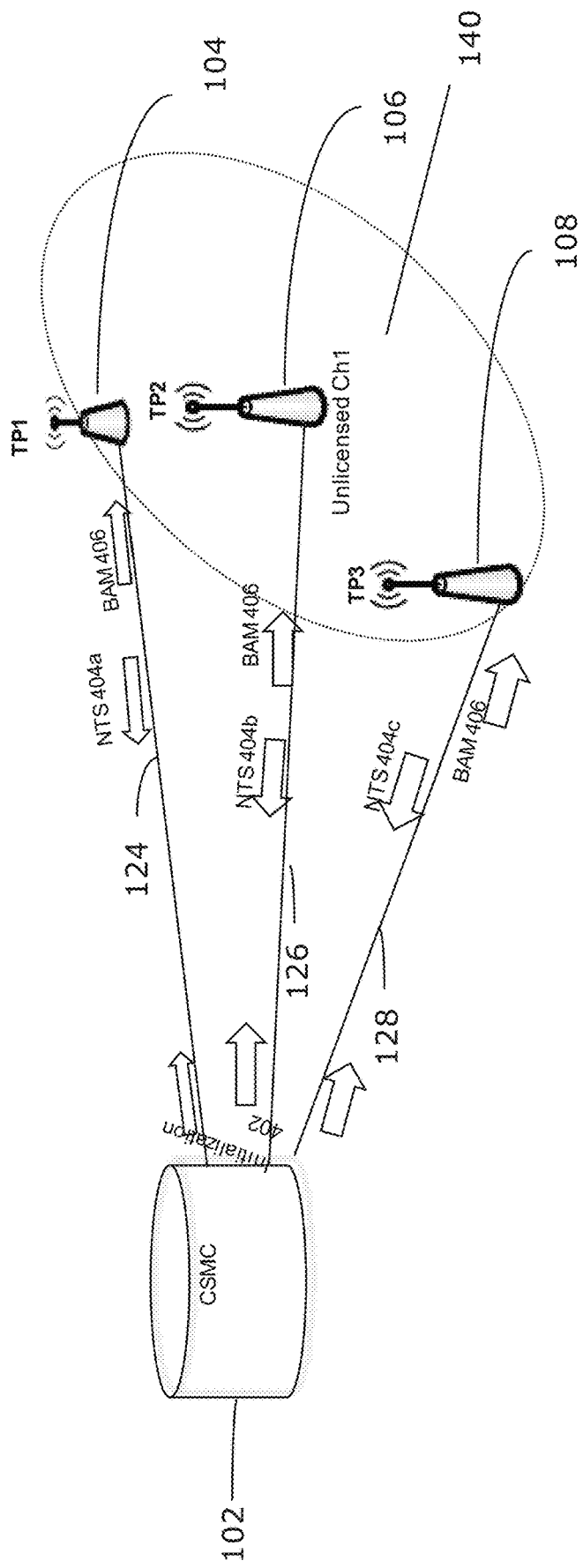
FIG. 4 is a diagram of an example system for implementing the example processes of the present disclosure.
Figure 5A:
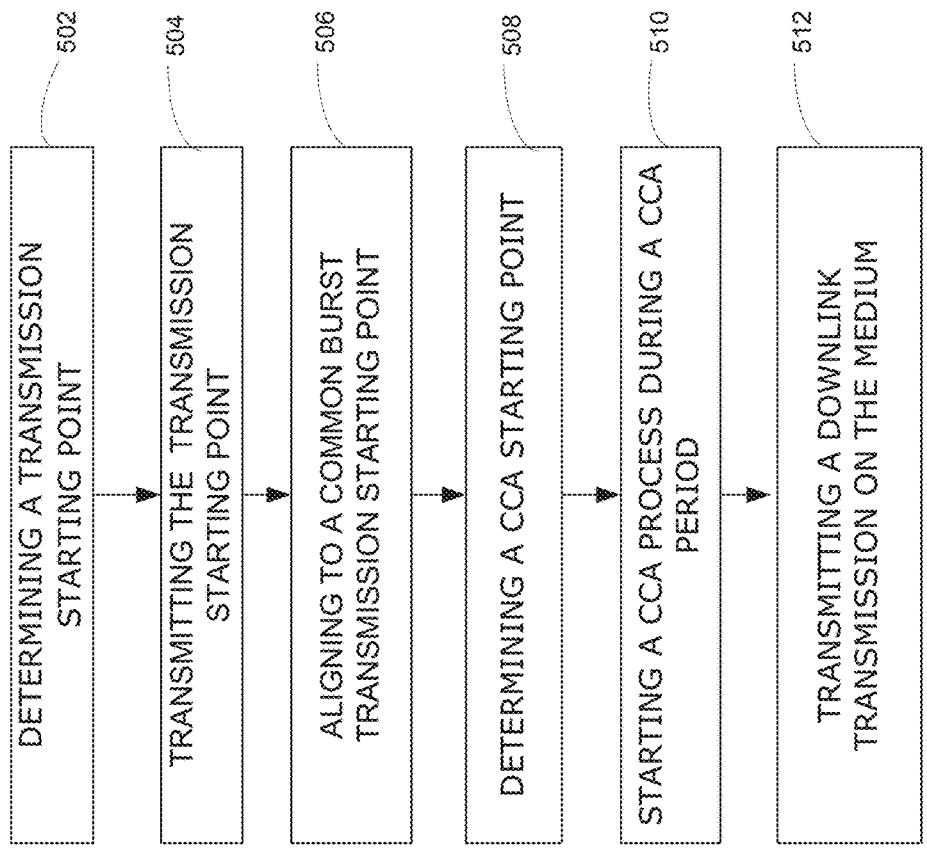
FIG. 5A is a block diagram illustrating example steps in an example process performed by a TP of a group TPs according to one embodiment of the present disclosure.
Figure 5B:
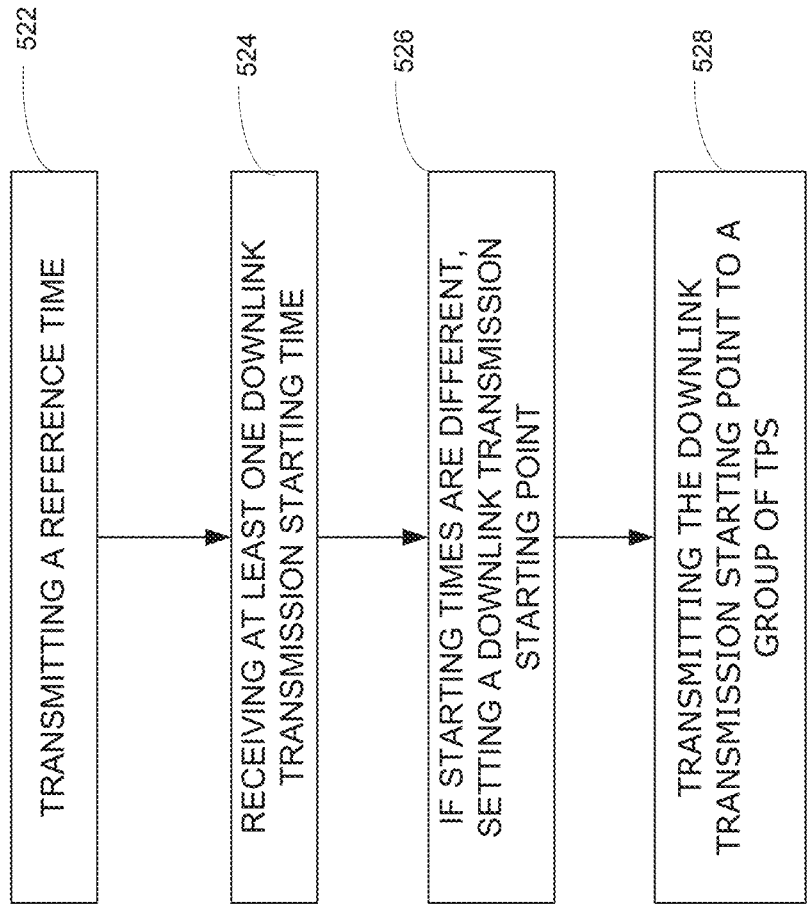
FIG. 5B is a block diagram illustrating example steps in a process performed by a controller of a TP group according to one embodiment of the present disclosure.

Reference is made to FIGS. 4, 5A and 5B. FIG. 4 illustrates an example system that allows a group of TPs synchronously access to the medium. According to one embodiment, FIG. 5A illustrating example steps performed by a TP of a group TPs, and FIG. 5B illustrates example steps performed by a controller of a group TPs.

A controller may form one or more TP groups. A TP group may include one or more TPs. The TPs may be LAA TPs. Each TP group uses an unlicensed spectrum channel. In FIG. 4, a CSMC 102 may transmit a reference time point in a multi-cast CCA initialization message 402 to a TP group 140, which comprises TPs 104, 106, and 108 over backhaul connection links 124, 126, and 128, respectively, to initialize CCA processes of these TPs (Step 522). The CCA initialization message 402 may indicate a reference time point, $t_o$, for TPs to initiate their respective CCA processes. From $t_o$, TPs 104, 106, and 108 determine their respective first target starting times $t_{target-i}$ for transmitting downlink bursts, such as downlink transmissions (step 502).

If a TP of the group TPs does not receive the CCA initialization message 402, the TP will operate independently in a single TP operation mode to be discussed below. In this case, when the TP has data and/or control to be transmitted, at to, the TP independently initiates CCA process.

In response to the CCA initialization message 402, the TPs 104, 106, and 108 transmits their respective target starting times $t_{target-i}$ in response messages, such as next target subframe (NTS) messages NTS 404a, NTS 404b, and NTS 404c, respectively, to a controller, such as the CSMC 102 (step 504). The target starting times $t_{target-i}$ are time references. "i" denotes a $TP_i$ of a TP group. A response message, such as an NTS, indicates the time index of a target starting time $t_{target-i}$ of downlink transmission of a TP. The time index is a value that represents a corresponding point of time. For Example, a time index of 3 represent the starting time of the $3^{rd}$ time unit, such as the $3^{rd}$ TTI. In an LAA TP, the time index of 3 may represent the starting time of the $3^{rd}$ downlink licensed spectrum subframe of the TP operating on a licensed spectrum.

In one embodiment, if a burst, or a downlink transmission, of a TP is not required to align with a starting time of a time unit, $t_{target-i}$ of each of TPs 104, 106, and 108 may be determined by $t_{target-i}=t_o+DIFS+CW_i$, where $CW_i$ is the random backoff counter value cws of the TP multiplied by a CCA slot duration.

In one embodiment, if a burst of a TP is required to align with a starting time of a time unit, $t_{target-i}$ of each of TPs 104, 106, and 108 may be determined by $t_{target-i}=$floor $[(t_o+DIFS+CW_i+T)/T]$, where $CW_i$ is the random backoff counter value cws of the TP multiplied by a CCA slot duration, and where T is a duration of a time unit. In another embodiment, each $t_{target-i}$ of the group TPs 104, 106, and 108 may be calculated as $t_{target-i}=$ceil$[(t_o+DIFS+CW_i)/T]$.

In one embodiment, TPs 104, 106, and 108 are LAA TPs, and the target starting times $t_{target-i}$ is required to correspond with a starting time of a licensed spectrum subframe. In one embodiment, each target starting time of the group TPs 104, 106, and 108 may be determined as $t_{target-i}=$floor$[(t_o+DIFS+CW_i+T_{subframe})/T_{subframe}]$, where the variable $CW_i$ is the backoff counter value multiplied by a CCA slot duration, and where $T_{subframe}$ is a duration of the a licensed spectrum subframe. $T_{subframe}$ may correspond to a duration of a TTI, time slot, or a smaller time granularity of the licensed spectrum resource grid. In one embodiment, a "fix" function, rather than a "floor" function, may be used for determining the $t_{target-i}$ for each of group LAA TPs. In another embodiment, each $t_{target-i}$ of the group LAA TPs 104, 106, and 108 may be calculated as $t_{target-i}=$ROUNDUP$[(t_o+DIFS+CW_i)/T_{subframe}]$.

If TPs 104, 106, and 108 are LAA TPs, different formulas may be used to determine the $t_{target-i}$ for each of TPs 104, 106, and 108, as long as $t_{target-i}$ is at least equal to floor$[(t_o+DIFS+CW_i+T_{subframe})/T_{subframe}]$ or ceil $[(t_o+DIFS+CW_i)/T_{subframe}]$ and aligned to a starting time of a licensed spectrum subframe. For the same $CW_i$ and $t_o$, the floor function and the ceil function render the same $t_{target-i}$.

In one embodiment, a TP group may include a controller and a TP. The TP may be an LAA TP. In this case, the TP may determine a burst transmission starting time $t_{target}$. If the TP is an LAA TP, the burst transmission starting time $t_{target}$ is aligned to a starting time of a licensed spectrum subframe. The TP may then determine the burst transmission starting time by $t_{target}=t_o+DIFS+CW$, where CW is the random backoff counter value of the TP multiplied by a CCA duration. $t_o$ is the initial starting time of the CCA process of the TP or an ending time of a previous burst transmission. $t_o$ may be provided by the controller or determined by the TP. If the TP is an LAA TP, the target starting time $t_{target}$ is aligned with a starting time of a licensed spectrum subframe. For example, $t_{target}=$floor$[(t_o+DIFS+CW+T_{subframe})/T_{subframe}]$, where the variable CW is the random backoff counter value of the TP multiplied by a CCA duration, and where $T_{subframe}$ is duration of the licensed spectrum subframe. $T_{subframe}$ may correspond to a duration of a TTI, time slot, or a smaller time granularity of the licensed spectrum resource grid. In one embodiment, a "fix" function, rather than a "floor" function, may be used for determining the $t_{target}$ for the TP, for example, $t_{target}=$ceil$[(t_o+DIFS+CW)/T_{subframe}]$.

In one embodiment, in response to the initialization message 402 or the BAM 406 (to be discussed below), each of the TPs 104, 106, and 108 may transmit a message, such as NTS 404a, NTS 404b, or NTS 404c, to the CSMC 102 by a delay. The delay of a TP may be different from delays of other TPs. Each delay may be assigned by the CSMC 102, and sent to the corresponding TP of the TPs 104, 106, and 108 in the CCA initialization message 402. The unique delay may be used to offset each response message, such as NTS 404a, NTS 404b, and NTS 404c, over the backhaul connection link.

In one embodiment, in response to the initialization message 402 or the BAM 406, the group TPs may send the response messages, such as NTS 404a, NTS 404b, and NTS 404c, simultaneously, if backhaul network topology and communication protocol allows.

In one embodiment, in response to the initialization message 402 or the BAM 406, each of the TPs 104, 106, and 108 may send its response message, such as NTS 404a, NTS 404b, or NTS 404c, use its spontaneously generated small random offsets over the backhaul connection link. In this case, a maximum allowable delay of a response message should be within a period set by the CSMC 102. For example, the CSMC 102 may set a period within which all response messages should be received after the CSMC 102 has sent the initialization message 402 or a BAM 406 to the TPs.

The CSMC 102 receives the response messages, such as NTS 404a, NTS 404b, and NTS 404c, each containing a target starting time $t_{target-i}$ of the TPs 104, 106, or 108 for the TP to transmit a downlink burst (step 524).

In one embodiment, if across the entire group of the TPs 104, 106, and 108, a "full agreement" has not been reached on the target starting time of downlink burst transmission (in other words, at least one $t_{target-i}$ of a TP of the TPs 104, 106, and 108 is not the same as other TPs' $t_{target-i}$), the CSMC 102 sets a common starting time $t_{target}$ for the group TPs 104, 106, and 108 (step 526). The common starting time $t_{target}$ may accommodate all of the $t_{target-i}$ of the group TPs. The common starting time $t_{target}$ may be an earliest possible starting time of the group TPs. For example, the $t_{target}$ may be the maximum $t_{target-i}$ of the group TPs. The CSMC 102 may then transmit the common starting time $t_{target}$ the group of TPs 104, 106, and 108 in a multi-cast to burst alignment message (BAM) message 406 over the backhaul connection links 124, 126, and 128 (step 528). The TPs 104, 106, and 108 receives the BAM 406 from the CSMC 102 and extracts the common starting time $t_{target}$ from the BAM 406. With the common starting time $t_{target}$, the TPs 104, 106, and 108 may align respective downlink transmission starting times to the common starting time $t_{target}$ (step 506). As such, the group TPs may transmit downlink bursts synchronously from the common starting time $t_{target}$. In the context of an LAA network, the common starting time $t_{target}$ corresponds to a starting time of a licensed spectrum subframe that accommodates all of the $t_{target-i}$.

In one embodiment, if a "full agreement" has been reached on the target starting time of downlink burst transmission (i.e., all of the $t_{target-i}$ of the group TPs 104, 106, and 108 are the same), the CSMC 102 can but may choose not to send a BAM 406 to the TPs so that a signaling message is saved. In this case, if the TPs do not receive a BAM 406 within a predetermined period that is set and announced in the initialization message 402 by the CSMC 102, each TP may use its own $t_{target-i}$ as the target starting time of downlink transmission. The predetermined period is longer than the period in which a BAM is scheduled to be sent to the TPs. As such, with respective $t_{target-i}$, the group TPs 104, 106, and 108 may transmit downlink bursts synchronously and the downlink burst transmissions are aligned to the same starting time $t_{target-i}$. If the TPs are LAA TPs, common $t_{target-i}$ corresponds to a starting time of a licensed spectrum subframe, and downlink burst transmissions of the LAA TPs are aligned to the starting time of the licensed spectrum subframe.

Based on the common starting time $t_{target}$, if "full agreement" has not been reached, or common $t_{target-i}$ "full agreement" has been reached, the TPs 104, 106, and 108 determine their respective CCA starting times $t_{CCA-i}$ (step 508), which are prior to the common starting time $t_{target}$ or $t_{target-i}$. The TPs 104, 106, and 108 may thus determine corresponding CCA periods $P_{CCA}$ between CCA starting times $t_{CCA-i}$ and the common downlink transmission starting time $t_{target}$ or $t_{target-i}$. For example, a CCA starting time may be determined as $t_{CCA-i} = t_{target}/t_{target-i} - (DIFS+CW_i)$. A CCA period may be defined as $P_{CCA-i} = t_{target}/t_{target-i} - t_{CCA-i}$. The CCA starting time $t_{CCA-i}$ enables the TPs 104, 106, and 108 to complete respective CCA processes at the common downlink transmission starting time $t_{target}$ or $t_{target-i}$, "at" the common downlink transmission starting time leaves no time gap between the $t_{target}$ or $t_{target-i}$ and the respective CCA process completing time.

In one embodiment, the CSMC 102 may determine a time gap between the CCA between the $t_{target}$ or $t_{target-i}$ and the respective CCA process completing time, and the time gap is sent in a message from the CSMC 102, such as in an the initialization message 402 or the BAM 406.

In one embodiment, a TP group may include a controller and a TP. The TP may be an LAA TP. In this case, the TP may determine a burst transmission starting time $t_{target}$. If the TP is an LAA TP, the burst transmission starting time $t_{target}$ is aligned to a starting time of a licensed spectrum subframe. The TP may then determine the burst transmission starting time $t_{target} = t_o + DIFS + CW$, where CW is the random backoff counter value of the TP multiplied by a CCA slot duration. $t_o$ is the initial starting time of the CCA process of the TP or an ending time of a previous burst transmission. $t_o$ may be provided by the controller or determined by the TP. If the TP is an LAA TP, the target starting time $t_{target}$ is aligned with a starting time of a licensed spectrum subframe. For example, $t_{target} = floor[(t_o + DIFS + CW + T_{subframe})/T_{subframe}]$, where the variable CW is the random backoff counter value of the TP multiplied by a CCA slot duration, and where $T_{subframe}$ is duration of the a licensed spectrum subframe. $T_{subframe}$ may correspond to a duration of a TTI, time slot, or a smaller time granularity of the licensed spectrum resource grid. In one embodiment, a "fix" function, rather than a "floor" function, may be used for determining the $t_{target}$ for the TP, for example, $t_{target} = ROUNDUP[(t_o + DIFS + CW)/T_{subframe}]$. Based on the burst transmission starting time $t_{target}$, the TP may further determine its CCA starting time $t_{CCA}$, which is prior to the burst transmission starting time $t_{target}$ and enables the TP to complete the CCA processes at $t_{target}$. For example, $t_{CCA} = t_{target} - (DIFS+CW)$. A CCA period of the TP thus may be defined as $P_{CCA} = t_{target} - t_{CCA}$. As such, the CCA process starting time enables the TP to complete the CCA process at the burst transmission starting time $t_{target}$. "at" the burst transmission starting time leaves no time gap between the $t_{target}$ and the CCA process completing time. For a TP group including a single TP, because the controller does not need to coordinate the a common starting time for the group TP, the NTS and the BAM messages can be, but may choose not to be exchanged between the controller and the TP.

In one embodiment, the CSMC 102 may determine a time gap between the CCA between the $t_{target}$ and the respective CCA process completing time, and the time gap is sent in a message from the CSMC 102, such as in an the initialization message 402 or the BAM 406.

A TP of a TP group, such as each of the TPs 104, 106, and 108, may perform CCA processes during the CCA periods $P_{CCA-i}$ (step 510). During a CCA process, a TP continuously senses the medium using, for example, ED-based CCA. When the TP is sensing the medium during a CW period (extended CCA period), the backoff counter value cws decrements by 1 when a CCA slot duration has elapsed, and is decreased to 0 at the completing time of CW. At the end of the CCA process, if a TP of the group TPs declares that the medium is idle (a successful CCA), the TP will start transmitting a downlink burst over the medium at the common $t_{target}$ or common starting time $t_{target-i}$ (Step 512). If at least one of the TPs 104, 106, or 108 declare that the medium is idle, the at least one TPs 104, 106, or 108 may start transmitting a burst over the medium at the common $t_{target}$ or common starting time $t_{target-i}$. The burst transmission of a TP is completed at the point $t_{ei}$.

Therefore, for a TP group either with a plurality of TPs or a TP, the CCA process starting time enables the TP to complete the CCA process at the burst transmission starting time $t_{target}$. "at" the burst transmission starting time leaves no time gap between the $t_{target}$ and the respective CCA process completing time. Therefore, as there is no time gap between the completing time of the CCA processes and the common starting time of the downlink burst transmissions, this mechanism does not involve any deferring time periods or blocking signals between the completing time of the CCA processes and the common starting time of the downlink burst transmissions. As such, during the deferring time periods, potential collisions of downlink burst transmission between the group of TPs and TPs of WLAN or other LAA groups may be avoid. After the medium is declared idle by a TP of the group TPs, the TP generates a new random backoff counter value cws, and based on the current burst transmission ending time $t_{ei}$, the TP, determines a next starting time for downlink burst transmissions, for example, $t_{target-next} = t_{ei} + DIFS + CW_i$, where $CW_i$ is the backoff counter value of the TP multiplied by a CCA slot duration. If the TP is an LAA TP, the next starting time for downlink burst transmissions aligns with a licensed frequency subframe starting time, for example, $t_{target-next} = floor[(t_{ei} + DIFS + CW_i + T_{subframe})/T_{subframe}]$ or $t_{target-next} = ceil[(t_{ei} + DIFS + CW_i)/T_{subframe}]$.

During the period after the medium is declared idle by a TP but before a BAM message is received from the controller, the TP may then send back to a controller, such as the CSMC 102, a response message, such as an NTS message. The response message indicates the new target starting time $t_{target-next}$ of the TP.

If the $t_{target-next}$ of the TP is different from the $t_{target-next}$ of other TPs of the group, the controller determines a common downlink transmission starting time $t_{target}$ for the group TPs and transmits over backhaul connection links the common downlink transmission starting time $t_{target}$ in a multi-cast response message, such as a BAM, to the group TPs. A TP of the group TPs may receive a BAM response within a very small delay after its NTS has been transmitted to the controller, such as 1 μs or even in the order of nanosecond (ns). If the BAM response has been received, the $TP_i$ extracts the common $t_{target}$ and determines its new CCA starting time $t_{CCA-i}$. If the $t_{target-next}$ of the TP is same as the $t_{target-next}$ of other TPs of the group, the response message, such as a BAM, may not be sent to the TPs of the group. If a BAM has not been received within a predetermined period, the $TP_i$ uses its own $t_{target-i}$ to calculate its new CCA start $t_{CCA-i}$.

If a TP of a group TPs declares that the medium is busy during the CCA process, either during the DIFS period or the CW period, the TP 1) delays its bursts transmission previously scheduled at the common starting time $t_{target}$ or common starting time $t_{target-i}$ on the downlink of the medium, 2) freezes the remaining value of the random backoff counter of the TP, and 3) attempts to perform a next CCA process using the remaining value of the frozen backoff counter, with the next CCA process completing at a next possible starting time of a reference time unit without a time gap between the next CCA process completing time and the next possible starting time of the reference time unit, such as an earliest possible licensed spectrum subframe starting time. Unlike the LBT mechanism described in FIGS. 3A and 3B, where a TP constantly senses the medium when the medium is busy, the TP only senses the medium again during the time period immediately before the next possible starting time. If the TP is an LAA TP, the TP attempts to perform CCA using the remaining value of the frozen backoff counter during the period before the next earliest possible starting time of a licensed spectrum subframe. The next CCA period in this case will start with the DIFS and decrement the remaining value of the backoff counter of the TP during the CW period. The completing time of the CW period is at the starting time of the next target downlink transmission time unit, namely, no time gap between the completing time of CW period and the starting time of the next target downlink transmission time unit.

Figure 6:
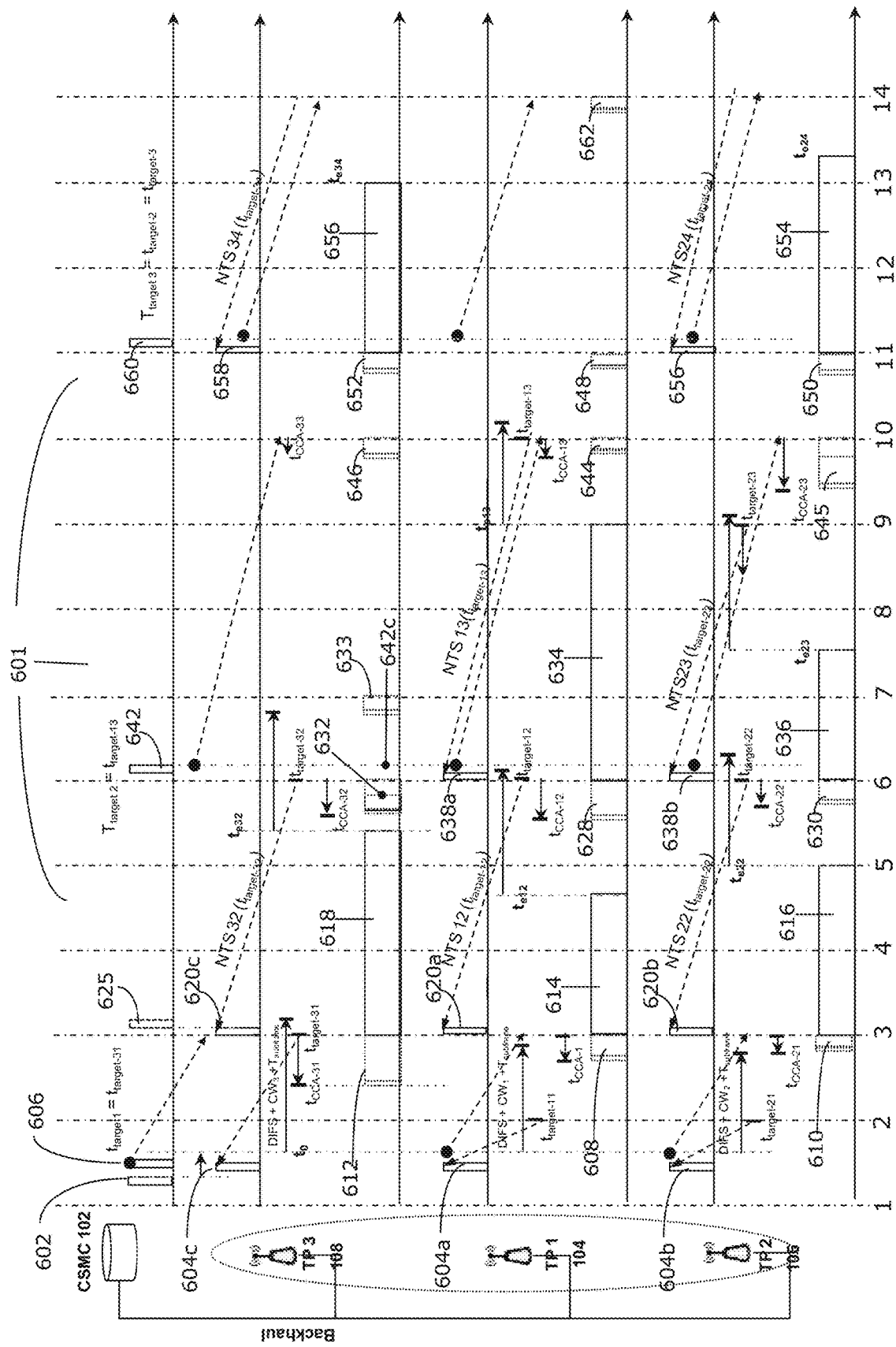
FIG. 6 is a diagram illustrating examples for a group of TPs synchronously access to unlicensed spectrum according to one embodiment of the present disclosure.

In one embodiment, after a TP declares that the medium is busy, and if the TP receives a response message, such as a BAM 406, from the controller during a subsequent CCA process or between a medium busy indication and a deferred CCA starting time, the TP 1) freezes the remaining value of the backoff counter of the TP, and 2) defers CAA to the time unit immediately before the new starting time $t_{target}$ indicated in the message from the controller, such as a BAM 406, at the starting time $t_{CCA-i} = t_{target} - (DIFS + CW_i')$, where $CW_i'$ is the remaining value of the frozen random backoff counter. As such, rather than starting sensing at a next earliest possible starting time, the TP defers sensing the medium to the period immediately before the new starting time $t_{target}$ indicated in the message from the controller, such as a BAM 406, because other TPs of the group to which the TP belongs may be transmitting bursts on the medium during the period immediately before the new starting time $t_{target}$, and the TP would declare that the medium is busy again. As shown in FIG. 6 to be discussed below, the new starting time indicated in the message from the controller may be the same or later than the next possible starting time of a reference time unit.

By performing CCA in the period immediately before a next possible starting time, such as a next earliest possible starting time, of a reference time unit, or immediately before the new starting time $t_{target}$ indicated in the latest BAM received, the TP saves power and neutralizes the aggressiveness of ED-based CCA process as proposed in Release 13 of 3GPP. This will contribute to the coexistence fairness with other radio access technologies, such as WLAN, or other networks operating on unlicensed spectrum.

There is no stringent requirement on the capacity or the latency of backhaul connection links. For example, the NTS message 404 is sent only at beginning of or during the transmission of a burst and the payload of the NTS may carry only the time index of the TP. As well, the BAM 406 response is a single multi-cast message and may not be sent if all of the group TPs have indicated the same downlink transmission starting time. Additionally, the BAM 406 is not time critical as long as a TP receives the BAM 406 before the TP starts the new CCA based on the TP's own target starting time.

A Single TP Operation Mode

The group TPs 104, 106 and 108 in the example of FIG. 4 may autonomously falls back to a single TP operation mode in the absence of a CSMC 102 or in the case that the TPs 104, 106 and 108 are not grouped.

In a single TP operation mode, a TP operates independently. The TP initiates a CCA process at a reference time point $t_o$, when the TP has data, including user data and control data, to be transmitted. Each TP may first determine a burst transmission starting time $t_{target}$. In one embodiment, if a burst of the TP is not required to align with a starting time of a time unit, $t_{target}$ of the TP may be determined by the TP as $t_{target}=t_o+DIFS+CW$, where CW is the random backoff counter value cws of the TP multiplied by a CCA slot duration. In one embodiment, if a burst of the TP is required to align with a starting time of a time unit, $t_{target}$ of the TP may be determined by $t_{target}=floor[(t_o+DIFS+CW+T)/T]$, where CW is the random backoff counter value cws of the TP multiplied by a CCA slot duration, and where T is a duration of a time unit. In another embodiment, each $t_{target-i}$ of the group TPs 104, 106, and 108 may be calculated as $t_{target}=ceil[(t_o+DIFS+CW)/T]$.

In one embodiment, the TP is an LAA TP, and the target starting times $t_{target}$ is required to correspond with a starting time of a licensed spectrum subframe. In one embodiment, the target starting time $t_{target}$ of the TP may be determined as $t_{target}=floor[(t_o+DIFS+CW+T_{subframe})/T_{subframe}]$.

The TP may further determine its CCA starting time $t_{CCA}$, for example, $t_{CCA}=t_{target}-(DIFS+CW)$. The CCA starting time $t_{CCA}$ enables the TP to complete the CCA process at the burst transmission starting time $t_{target}$. "at" the burst transmission starting time leaves no time gap between the $t_{target}$ and the CCA process completing time. The burst transmission starting time $t_{target}$ corresponds with a starting time of a licensed spectrum subframe. A TP perform its CCA process. If the CCA process is successful, the TP transmits over the medium the downlink burst from the burst transmission starting time $t_{target}$. The burst transmission of a TP is completed at the point $t_e$.

In an embodiment, the CSMC 102 may determine a time gap between the CCA between the $t_{target}$ and the CCA process completing time, and the time gap information is sent in a message from the CSMC 102, such as in an the initialization message 402 or the BAM 406.

As a result, the CCA process starting time enables the TP to complete the CCA process at the burst transmission starting time $t_{target}$. "at" the burst transmission starting time leaves no time gap between the $t_{target}$ and the CCA process completing time, and as such the downlink burst is transmitted over the medium without any deferring time period or blocking signal.

After the medium is declared idle by the TP, the TP generates a new random backoff counter value cws, and based on the current burst transmission ending time $t_e$, the TP determines a next starting time for downlink burst transmissions, for example, $t_{target-next}=t_e+DIFS+CW_2$, where $CW_2$ is the backoff counter value of the TP multiplied by a CCA slot duration. If a burst of the TP is required to align with a starting time of a time unit, $t_{target}$ of the TP may be determined by $t_{target}=floor[(t_e+DIFS+CW_2+T)/T]$, where T is a duration of a time unit. If the TP is an LAA TP, the next starting time for downlink burst transmissions aligns with a licensed frequency subframe starting time, for example, $t_{target-next}=floor[(t_e+DIFS+CW_2+T_{subframe})/T_{subframe}]$ or $t_{target-next}=ROUNDUP[(t_{et}+DIFS+CW_2)/T_{subframe}]$. The TP may further determine its CCA starting time $t_{CCA-next}$, for example, $t_{CCA-next}=t_{target-next}-(DIFS+CW_2)$. The $t_{CCA-next}$ enables the TP to complete the CCA process at the burst transmission starting time $t_{target-next}$. "at" the burst transmission starting time leaves no time gap between the $t_{target-next}$ and the CCA process completing time.

In an embodiment, the CSMC 102 may determine a time gap between the CCA between the $t_{target-next}$ and the CCA process completing time, and the time gap is sent in a message from the CSMC 102, such as in an the initialization message 402 or the BAM 406.

If the CCA process is unsuccessful, the TP 1) delays its bursts transmission previously scheduled at the $t_{target}$ or $t_{target-next}$ 2) freezes the remaining value of the random backoff counter of the TP, and 3) attempts to perform a next CCA process using remaining value of the frozen backoff counter, with the next CCA process completing at a next possible starting time of a reference time unit, namely, no time gap between the next CCA process completing time and the next possible starting time of the reference time unit. The starting time of the reference time unit may be a licensed spectrum subframe starting time. The TP only senses the medium again during the period immediately before the next possible starting time. If the TP is an LAA TP, the TP attempts to perform the next CCA process using remaining value of the frozen backoff counter during the period immediately before the next earliest possible starting time of a licensed spectrum subframe. As such, the TP saves power and neutralizes the aggressiveness of ED-based CCA process as proposed in Release 13 of 3GPP. This will contribute to the coexistence fairness with other radio access technologies, such as WLAN, or other networks operating on unlicensed spectrum.

Examples of Access to Unlicensed Spectrum by a TP Group with a Controller and a Plurality of TPs FIG. 6 illustrates example scenarios of access to unlicensed spectrum. The TP group in the example of FIG. 6 is associated with a CSMC 102 and three TPs 104, 106, and 108. The CSMC 102 is connected with each of the three TPs 104, 106, and 108 via backhaul connection links for message exchanges between the CSMC 102 and each of the three TPs 104, 106, and 108.

The CSMC 102 initiates CCA processes of the TPs 104, 106, and 108, by sending out a multi-cast CCA initialization message 602 to each of the TPs via backhaul connection links. The CCA initialization message 602 set out a reference time $t_o$ from which TPs 104, 106, and 108 determine their respective downlink transmission starting time $t_{target-i}$. In the example of FIG. 6, $t_{target-i}$ is determined using the "floor" function, and $t_{target-i}=floor[(t_o+DIFS+CW+T)/T]$. $CW_{i1}$ is the backoff counter value of a $TP_i$ multiplied by a CCA slot duration, in the example of FIG. 6, the $TP_i$ may be one of the TPs 104, 106, and 108. T is a time duration 601 between any two adjacent time indices, such as the duration between the time indices 1 and 2 in FIG. 6. Other functions may be used for each TP to determines its $t_{target-i}$, such as $t_{target-i}=ceil[(t_o+DIFS+CW_{i1})/T]$, as long as $t_{target-i}$ is an earliest possible starting time of a time duration. $t_{target-i}$ corresponds to a point of time indices 1-14 as shown in FIG. 6. If the TPs 104, 106, and 108 are LAA TPs, T is a duration of a licensed spectrum subframe, and $t_{target-i}$ is a starting time of the licensed spectrum subframe. In the Example of FIG. 6, TP1 104 determines that its initial starting time is $t_o+DIFS+CW_{11}+T$, which is between time indices 2 and 3. With the "floor" function, $t_{target\text{-}11}$ is rounded down to the time point at time index 2. TP1 is then transmits the information of $t_{target\text{-}11}$ to the CSMC 102 in a response message 604a, which may be a NTS if TP1 104 is an LAA TP. Similarly, TP2 106 determines that its initial starting time is $t_o+DIFS+CW_{21}+T$, which is also between time indices 2 and 3. With the "floor" function, $t_{target\text{-}21}$ is rounded down to the starting time at time index 2. TP2 106 then transmits the information of $t_{target\text{-}21}$ to the CSMC 102 in a response message 604b, which may be a NTS if TP2 is an LAA TP. TP3 108 determines that its initial starting time is $t_o+DIFS+CW_{31}+T$, which is between time indices 3 and 4. With the "floor" function, $t_{target\text{-}31}$ is rounded down to time index 3. TP3 108 then transmits the information of $t_{target\text{-}31}$ to the CSMC 102 in a response message 604c, which may be a NTS if TP3 108 is an LAA TP. The response messages 604a, 604b, and 604c are transmitted to the CSMC 102 at the same time over the backhaul connection links.

The CSMC 102 receives the response messages 604a, 604b, and 604c, which contain the starting time information $t_{target\text{-}11}$, $t_{target\text{-}21}$, and $t_{target\text{-}31}$, respectively. As $t_{target\text{-}11}$, $t_{target\text{-}21}$, and $t_{target\text{-}31}$ are different, the CSMC 102 determines a common starting time $t_{target1}$ for all of the group TPs so that all of the group TPs may start downlink transmissions, such as downlink bursts, at the same starting time $t_{target}$. In an embodiment, $t_{target1}$ may be the earliest starting time of all the TPs. In the example of FIG. 6, the CSMC 102 determines that the earliest common starting time of the TPs is at the time index 3, the latest starting time among $t_{target\text{-}11}$, $t_{target\text{-}21}$, and $t_{target\text{-}31}$. The CSMC 102 then transmits the common starting time $t_{target1}$ in a multi-cast message 606, such as in a BAM, to the TPs 104, 106, and 108 via the backhaul connection links.

The TPs 104, 106, and 108 receive the message 606 and extract the $t_{target1}$ from the message 606. Based on the $t_{target1}$, TPs 104, 106, and 108 determine their respective CCA starting times $t_{CCA\text{-}i}$, which are prior to the $t_{target1}$. Based on the $t_{target1}$, the TP1 104 determines its CCA starting time $t_{CCA\text{-}1}$, for example, $t_{CCA\text{-}11}=t_{target1}-(DIFS+CW_{11})$. Similarly, based on the $t_{target1}$, the TP2 106 determines its CCA starting time $t_{CCA\text{-}21}$, for example, $t_{CCA\text{-}21}=t_{target1}-(DIFS+CW_{21})$, and the TP3 108 determines its CCA starting time $t_{CCA\text{-}31}$, for example, $t_{CCA\text{-}31}=t_{target1}-(DIFS+CW_{31})$. As shown in FIG. 6, $t_{CCA\text{-}11}$, $t_{CCA\text{-}21}$, and $t_{CCA\text{-}31}$ and are prior to the $t_{target1}$ in time and enable the TPs to complete the CCA processes at the burst transmission starting time $t_{target1}$. "at" the burst transmission starting time, or downlink transmission starting time, leaves no time gap between the $t_{target1}$ and the respective CCA process completing times of the TPs. After the CCA starting times have been determined, TPs 104, 106, and 108 sense the medium using, for example, ED-based CCA processes 608, 610, and 612, respectively. A CCA process includes a DIFS period and a CW period. As shown in FIG. 6, the TPs first complete respective DIFS periods and then complete respective RCW periods.

In the example of FIG. 6, the CCA processes 608, 610, and 612 are successfully completed at the $t_{target1}$. The TPs 104, 106, and 108 start transmitting respective bursts 614, 616, and 618 on the medium at $t_{target1}$, which is at index 3. As shown in FIG. 6, there is no time gap between CCA processes 608, 610, and 612 and $t_{target1}$ at index 3. The TPs 104, 106, and 108 also respectively determine the lengths of bursts 614, 616, and 618, and the ending times $t_{e12}$, $t_{e22}$, and $t_{e32}$ of the bursts.

Each of the TPs 104, 106, and 108 generates a new random backoff value $CW_i$ and determines its target downlink target transmission starting time $t_{target\text{-}i}$, for example, $t_{target\text{-}i2}=\text{floor}[(t_o+DIFS+CW_{i2}+T)/T]$. In FIG. 6, $t_{target\text{-}12}$, $t_{target\text{-}22}$, and $t_{target\text{-}32}$ are rounded down to the same starting time, at time index 6. The TPs 104, 106, and 108 transmits to the CSMC 102 respective $t_{target\text{-}12}$, $t_{target\text{-}22}$, and $t_{target\text{-}32}$ in messages 620a, 620b, and 620c, which may be NTS1, NTS2, and NTS3 if TPs 104, 106, and are LAA TPs.

As the $t_{target\text{-}12}$, $t_{target\text{-}22}$, and $t_{target\text{-}32}$ indicate the same starting time of next downlink transmissions, a "full agreement" has reached among the TPs of the group. In this case, it is not necessary for the CSMC 102 to send the response message 625 to the TPs. If the TPs have not received within a predetermined period the response message, the TPs use respective $t_{target\text{-}12}$, $t_{target\text{-}22}$, and $t_{target\text{-}32}$ as respective starting times of the downlink burst transmissions. The CSMC 102 sets the predetermined period and announces it in the CCA initialization message 602.

The CCA starting times $t_{CCA\text{-}12}$ $t_{CCA\text{-}22}$ $t_{CCA\text{-}32}$ may be determined based on $t_{CCA\text{-}12}=t_{target\text{-}12}-(DIFS+CW_{12})$, $t_{CCA\text{-}22}=t_{target\text{-}22}-(DIFS+CW_{22})$, $t_{CCA\text{-}32}=t_{target\text{-}32}$ $(DIFS+CW_{32})$. TP1 104 and TP2 106 have successfully completed the CCA processes and start transmitting bursts 634 and 636 respectively at the common starting time at time index 6. Based on the lengths of the bursts, the TP1 104 and TP2 106 also determine the ending times $t_{e13}$ and $t_{e23}$ of the bursts 634 and 636.

Each of the TPs 104 and 106 generates a new random backoff value $CW_{i3}$ and determines its target downlink target transmission starting time $t_{target\text{-}i3}$, for example, $t_{target\text{-}i3}=\text{floor}[(t_{e13}+DIFS+CW_{i3}+T)/T]$. In FIG. 6, $t_{target\text{-}13}$ is rounded down to time index 9, and $t_{target\text{-}23}$ is rounded down to the time index 10. The TPs 104 and 106 transmit to the CSMC 102 respective $t_{target\text{-}13}$ and $t_{target\text{-}23}$ in messages 638a and 638b, which may be NTS13 and NTS23 if the TPs 104 and 106 are LAA TPs.

During the CCA process, when a TP is sensing the medium during CW period, the backoff counter value cws of the TP decrements by 1 when a CCA slot duration has elapsed, and is decreased to "0" at the completing time of the CW. At the time point 632, TP3 108 senses that the status of the medium becomes busy before the downlink transmission starting time at time index 6. As a result, TP3 108 does not transmit a message to the CSMC 102 to indicate its starting time of next downlink transmission. TP3 108 freezes the remaining value of the random backoff counter of the TP3 108 at the point 632. TP3 108, by default, attempts to perform next CCA 633 completing at time index 7 with a new CW size corresponding with the remaining value of the random backoff counter. In response to messages such as NTS 13 and NTS 23 received from TP1 104 and TP2 106, respectively, the CSMC 102 determines a common starting point $t_{target}$, which is the same as $t_{target\text{-}13}$, the later time point between $t_{target\text{-}13}$ and $t_{target\text{-}23}$. The CSMC 102 transmits the $t_{target2}$ in a message 642 to TP1 104, TP2 106, and TP3 108, for example through a multi-cast message BAM. As the TP3 108 receives the message at time 642c, and as TP3 108 has not yet started a CCA process completing at time index 7, the common staring point $t_{target}$ contained in the message 642 overrides the default next CCA with a completing time at time index 7. Therefore, TP3 108 does not perform CCA process during the period ending immediately before time index 7 but defers the CCA process to the period completing at the common staring point $t_{target2}$, i.e., the time index 10. The next CCA period in this case will start at $t_{CCA\text{-}33}=t_{target2}-(DIFS+CW_{33})$, where $CW_{33}$ is a period corresponding with the remaining value of the initial $CW_{32}$ of the random backoff counter of TP3 108.

By not performing CCA processes during the periods completing at time indices 7, 8, and 9, the TP3 108 saves energy, and behaves less aggressively by not constantly sensing the medium. As such, this mechanism is fairer to the existing WLAN than the LBT proposed in Release 13 of the 3GPP. As well, during the period from time indices 7 to 9, TP1 104 keeps transmitting its burst 634. As such, even if TP3 108 kept performing CCA processes during this period, TP3 108 would sense that the medium is busy and its CCA process would be failed. Therefore, it is unnecessary for TP3 108 to perform CCA process during the period from time indices 7 to 9. As such, by not sensing the medium, the LBT mechanism is also more efficient than the one proposed in Release 13 of the 3GPP.

In FIG. 6, TP3 108 performs the CCA process 646 during the period between time indices 9 and 10 with a CCA period at starting time $t_{CCA-33}$. The CCA process 646 includes a DIFS and a $CW_{33}$ period.

Based on the common starting time $t_{target2}$ at time index 10, the TP1 104 and TP2 106 determine their respective CCA starting time $t_{CCA-13}=t_{target2}-(DIFS+CW_{13})$, and $t_{CCA-23}=t_{target2}-(DIFS+CW_{23})$. $t_{CCA-13}$ and $t_{CCA-23}$ are prior to the $t_{target2}$ in time and enable the TP1 104 and TP2 106 to complete the CCA processes at the burst transmission starting time $t_{target2}$. "at" the burst transmission starting time leaves no time gap between the $t_{targets}$ and the respective CCA process completing times of TP1 104 and TP2 106.

In an embodiment, the CSMC 102 may determine a time gap between the CCA between the $t_{targets}$ and the respective CCA process completing time, and the time gap is sent in a message from the CSMC 102, such as in an the initialization message 402 or the BAM 406.

TP1 104 and TP2 106 then perform respective CCA processes during the CCA periods 644 and 645. TPs 104, 106 and 108 declare that the medium is busy before the common starting time of downlink transmission at time index 10. As a result, TPs 104, 106 and 108 will freeze the remaining values of the respective backoff counters and attempt to perform their respective CCA processes during the next period with the CCA processes completing at time index 11. As TPs 104, 106 and 108 have no successful CCA process before the previous common starting time at time index 10, none of the TPs 104, 106 and 108 has transmitted to the CSMC 102 any messages indicating any next target downlink transmission starting time. As a result, the CSMC 102 has not transmitted a message to the TPs, such as a BAM, to indicate a common starting time at the time index 11. Accordingly, TPs 104, 106, and 108 perform their respective CCA processes 648, 650 and 652 during the period between time indices 10 and 11, with the completing time at time index 11. In this case, the common starting time of the TPs becomes time index 11.

Immediately before the common starting time at time index 11, TP2 106 and TP3 108 declare that the medium is idle and they start transmitting downlink bursts 654 and 656 starting from the common time index 11. TP2 106 and TP3 108 determine respective lengths of bursts and thus the respective ending times $t_{e24}$ and $t_{e34}$ of respective bursts 654 and 656. TP2 106 and TP3 108 then determine their respective next downlink transmission starting times $t_{target-24}=$ floor$[(t_{e24}+DIFS+CW_{24}+T)/T]$ and $t_{target-23}=$floor$[(t_{e34}+DIFS+CW_{34}+T)/T]$, both at time index 14. TP2 106 and TP3 108 indicate their respective $t_{target-24}$ and $t_{target-34}$ in respective messages to the CSMC 102, for example in NTS24 and NTS34.

As TP1 104 declares that the medium is busy prior to time index 11, TP1 does not transmit any message to CSMC 102 to indicate its next downlink transmission starting time.

In this case, as the starting times $t_{target-24}$ and $t_{target-34}$ are the same at time index 14, the CSMC 102 determines that a partial agreement is reached at time index 14, and transmits a common starting time at $t_{target3}$ at time index 14 in a multi-case message 660, such as a BAM, to the TP1 104, TP2 106 and TP3 108. As TP1 104 receives the message 660 earlier than next time indices 12 and 13, TP1 104 defers its next CCA process to the period between time indices 13 and 14 for the period 662 which has a completing time at time index 14.

Common Contention Window Size Generated by a Controller

According to one embodiment, rather than generating contention windows size based on the random backoff counter values by respective group TPs, a controller, such as a CSMC 102, may generate a common contention window size (CW) for all of the group TPs. The group TPs may include one or more TPs. The group TPs may be LAA TPs. In this case, the TPs report respective burst lengths information to the controller. The controller then determines a common contention window size (CW) value and a common downlink burst transmission starting time $T_{target}$ for the TPs of the group. The common contention window size value corresponds with the random contention duration of the CCA process. For example, $T_{target}$ may be $T_{target}=$floor $[(t_o+DIFS+CW+T)/T]$, $t_{target}=$roundup $[(t_o+DIFS+CW)/T]$, $T_{target}=$floor $\{[$maximum of the respective burst ending time$+DIFS+T+CW]/T\}$, or $T_{target}=$roundup $\{[$maximum of the respective burst ending time$+DIFS+CW]/T\}$, where to is a CCA initialization point set by the controller, and where T is a unit of the time. Each of the group TPs may set its backoff counter value corresponding with the CW value. If a TP does not receive the common CW value and/or the common downlink transmission starting time, the TP does not participate in the group access to unlicensed spectrum.

The configuration of CW usually depends on the traffic class served by a TP. If different service classes are being served by group TPs, the configuration of CW is based on the highest priority traffic class of the group TPs. Upon detection of time out, the controller may increase the value of CW, for example, doubling the CW from a previous value.

A TP Group with a Controller and a Plurality of TPs

Figure 7A:
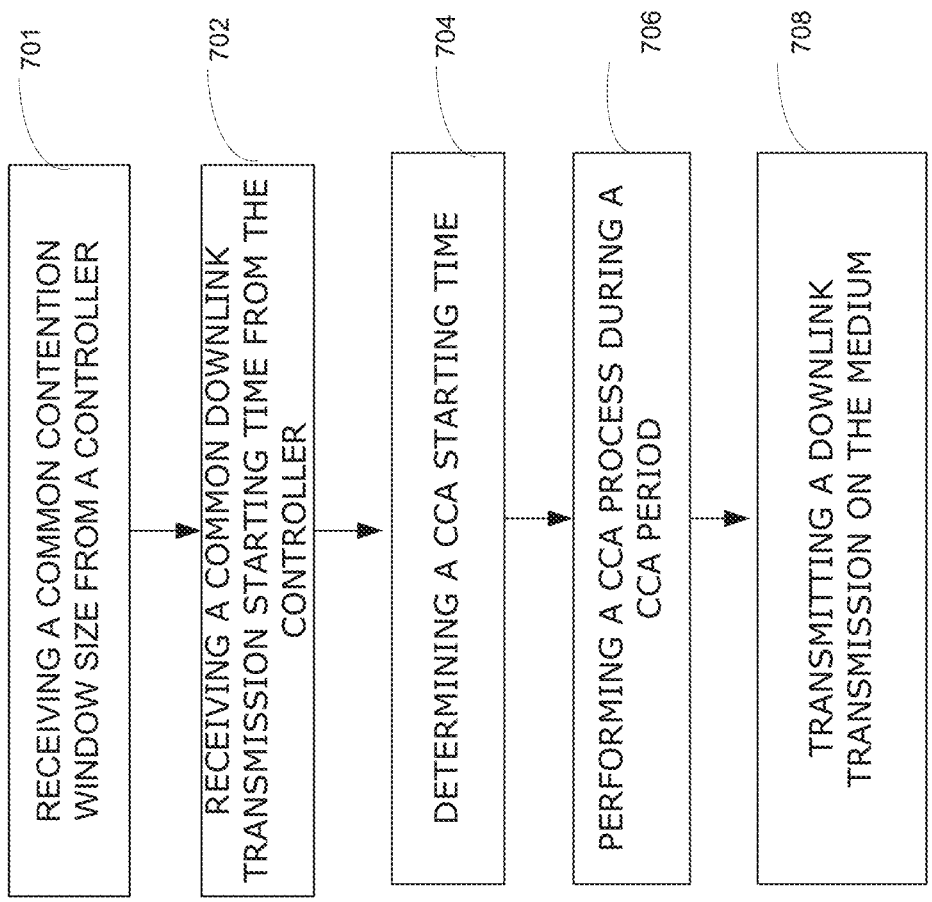
FIG. 7A is a block diagram illustrating example steps in an example process performed by a TP of a group TPs according to another embodiment of the present disclosure.
Figure 7B:
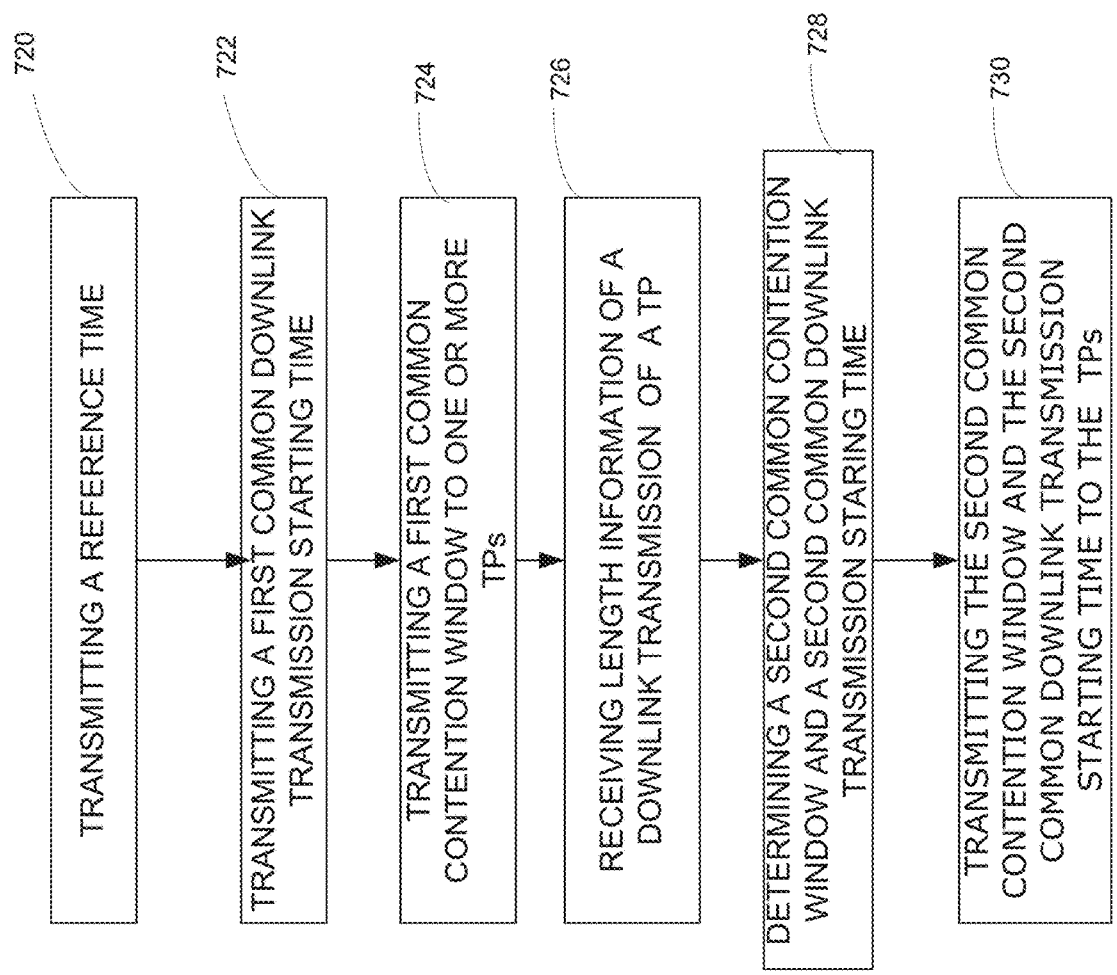
FIG. 7B is a block diagram illustrating example steps in a process performed by a controller of a TP group according to another embodiment of the present disclosure.
Figure 8:
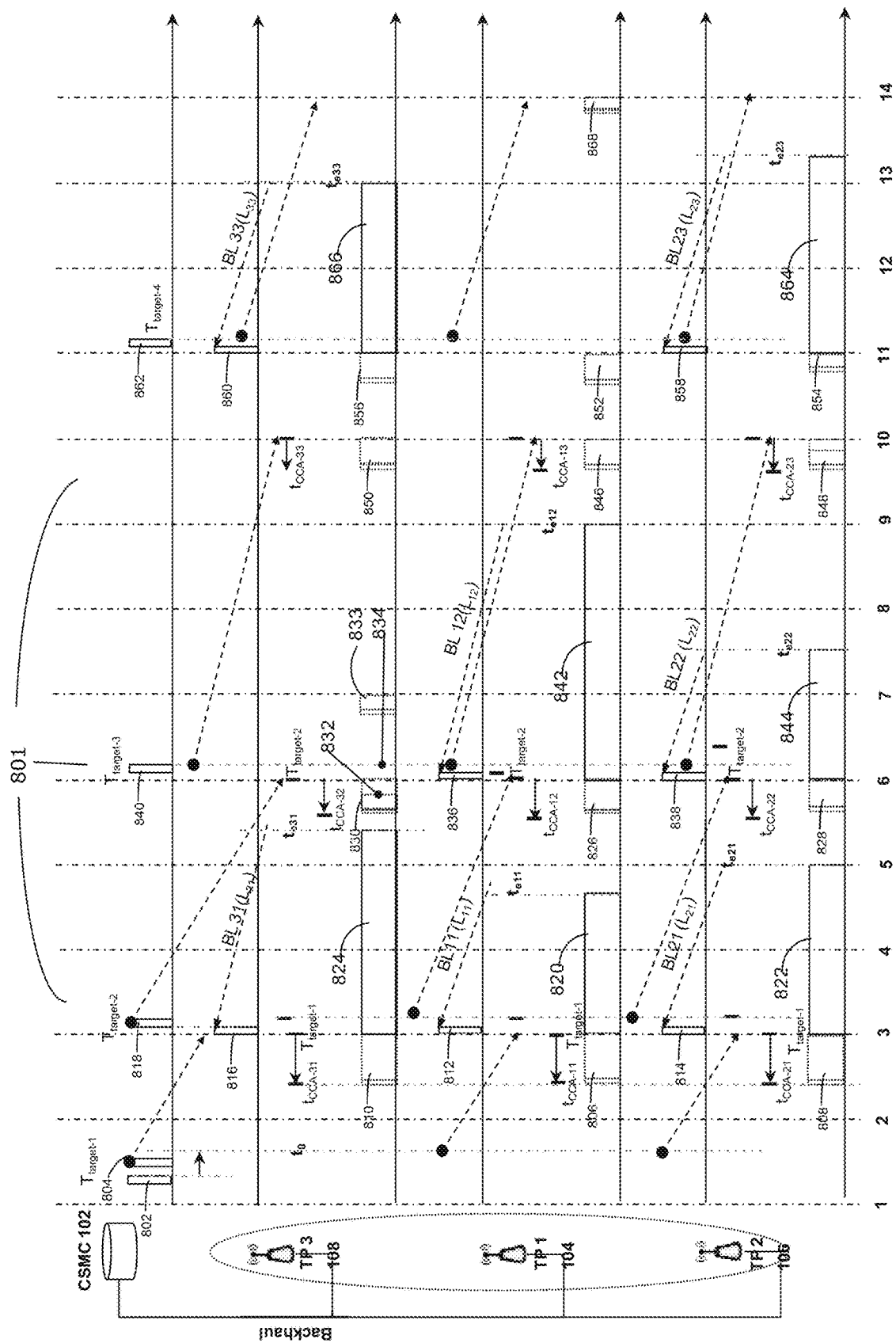
FIG. 8 is a diagrams illustrating examples for a group of TPs synchronously access to a unlicensed spectrum according to another embodiment of the present disclosure.

Reference is made to FIGS. 7A-7B and FIG. 8. The group TP may include one or more TPs. After the TP groups (clusters) have been formed per unlicensed channel, in the example of FIG. 8, the CSMC 102 may transmit a reference time point in a multi-cast CCA initialization message 802 to group TPs 104, 106, and 108 over the backhaul connection links 124, 126, and 128, respectively, to initialize CCA processes of these TPs (step 720). The CCA initialization message 802 indicates a reference time point, $t_o$. The TPs initiate their respective CAC processes at $t_o$. The CSMC 102 determines a common $CW_1$ and a common starting time for downlink transmission $T_{target-1}$. The common contention window size value $CW_1$ corresponds with the random contention duration. For example, $t_{target-1}=$floor $[(t_o+DIFS+CW_1+T)/T]$, or $t_{target-1}=$roundup $[(t_o+DIFS+CW_1)/T]$, where T is a unit of the time duration 801 which may be between any two adjacent time indices, such as between time indices 3 and 4. In an LAA network, T may be a duration of a licensed spectrum subframe. The CSMC 102 may transmit the common downlink transmission starting time $T_{target-1}$ to group TPs (step 722). The CSMC 102 may transmit the CW and $T_{target-1}$ in a multi-cast message 804, such as a BAM, to the group TPs (step 724). In one embodiment, the CW and $T_{target-1}$ may also be transmitted in the CCA initialization message 802. In FIG. 8, $T_{target-1}$ corresponds with time index 3.

If a TP of the group TPs does not receive the CCA initialization message 802, the TP will operate independently in a single TP operation mode as described above. In this case, when the TP has data, including user data and control data, to be transmitted at to, the TP initiates CCA process.

Each TP of the group TPs receives a common CW from the controller (step 701) and a common downlink transmission starting time $T_{target-1}$ (step 702). Based on the common CW, TPs set their respective backoff counter value to correspond with the common CW value. With $T_{target-1}$, each TP of the group TPs determines its starting time of the CCA process (step 704), for example, by $t_{CCA}=T_{target-1}-(DIFS+CW)$. $t_{CCA}$ is prior to $T_{target-1}$. As $T_{target}$, DIFS, and CW are the same with respect to each TP, $t_{CCA}$ are also the same for all of the TPs in the group. In other words, in FIG. 8, $t_{CCA-11}=t_{CCA-21}=t_{CCA-31}$. Because all of the TPs in the group have the same CCA starting times and the same downlink transmission starting times, in FIG. 8, the CCA periods 806, 808, and 810 are also the same.

Each TP in the group performs its CCA process during its CCA period (step 706). In FIG. 8, the CCA processes 806, 808, and 810 are successful and the medium is idle during the CCA processes 806, 808, and 810. Immediately after the respective CCA processes are completed, each TP then transmits its downlink burst on the medium (step 708), such as bursts 820, 822 or 824, at the common downlink transmission starting time $T_{target-1}$. As shown in FIG. 8, there is no time gap between the completing time of the CCA processes and the common downlink transmission starting time $T_{target-1}$. As such, synchronous downlink transmissions is achieved among the group TPs 104, 106 and 108 without deferring time periods or blocking signals between the completing times of CCA processes and the common starting time of the downlink transmission.

In an embodiment, the CSMC 102 may determine a time gap between the CCA between the $t_{target-1}$ and the CCA process completing time, and the time gap is sent in a message from the CSMC 102, such as in an the initialization message 402 or the BAM 406.

In FIG. 8, each TP determines the ending time of its downlink burst, such as $t_{e11}$, $t_{e21}$, or $t_{e31}$, and reports the length of its downlink burst (BL) in a message, such as 812, 814, or 816 in FIG. 8, to the CSMC 102. In one embodiment, if each TP is an LAA TP, the message may be a NTS.

In one embodiment, each TP may transmit its message 812, 814, or 816, to the CSMC 102 by a delay. The delay indicates a delay duration before each TP transmits the message to the CSMC 102. The delay of the TP may be different from delays of other TPs of the TP group. Each delay may be assigned by the CSMC 102, and sent from CSMC 102 to each TP of the TP group in the CCA initialization message 802 or a response message, such as a BAM. The delay may be used to offset the transmission of each message over the backhaul connection links.

In one embodiment, the delay may be generated by each TP of the group TPs. In this case, a maximum allowable delay of a response message, such as a NTS, may be applied from the time point of receiving the common CW in a previous BAM and before the transmission of the burst is completed. After a period predetermined by the CSMC 102, with the response messages received from the TPs, the CSMC 102 may further determine the common CW and common downlink transmission starting time of the group TPs based on the burst lengths indicated in the received messages.

In one embodiment, all of the TPs in the group may send the response messages 812, 814, and 816, simultaneously, if backhaul network topology and communication protocol allows.

After receiving the burst length information from each of the TP in the group (step 726), the controller, such as the CSMC 102, may determine a common contention window $CW_2$ and a common downlink transmission starting time $T_{target-2}$ (time index 6 in FIG. 8). The CSMC 102 sets $T_{target-2}$ long enough such that $T_{target-2}$ is equal or later than the ending time of the longest burst in the group, for example, $T_{target-2}=floor\{[max(t_{e11}, t_{e21}, t_{e31})+DIFS+T+CW_2]/T\}$. As such, all of the TPs may have a common starting time for the bursts to be transmitted next. The CSMC 102 may transmit the $CW_2$ and the common downlink transmission starting time $T_{target-2}$ in a multi-cast message 818, such as a BAM, to the TPs of the group (step 730).

TPs 104, 106, and 108 receive the message 818 and extract the $CW_2$ and $T_{target-2}$ from the message 818. Based on the $CW_2$, TPs set their respective backoff counter values to correspond with the $CW_2$ value. Based on the $t_{target-2}$, each of the TPs 104, 106, and 108 determines its respective CCA starting times $t_{CCA-12}$, $t_{CCA-22}$, or $t_{CCA-32}$. For example, $t_{CCA-12}=t_{CCA-22}=t_{CCA-32}=T_{target-2}-(DIFS+CW_2)$. $t_{CCA-12}$, $t_{CCA-22}$, and $t_{CCA-32}$ are prior to the $T_{target-2}$ in time.

After the CCA starting times have been determined, TPs 104, 106, and 108 sense the medium using, for example, ED-based CCA processes. A CCA process includes a DIFS and a CW period In FIG. 8, the TPs 104 and 106 successfully complete the respective CCA processes 826 and 828, and start transmitting respective downlink bursts 842 and 844 at the common starting time $T_{target-2}$. As well, TP1 104 and TP2 106 transmit their respective burst length information BL12 and BL22 in messages 836 and 838, such as NTS messages, to the CSMC 102. The ending time of burst 842 is $t_{e12}$ and the ending time of burst 844 is $t_{e22}$.

During a CCA process, when a TP is sensing the medium during CW period, the backoff counter value cws of the TP decrements by 1 when a CCA slot duration has elapsed, and is decreased to 0 at the completing time of the CW. During the CCA process 830, TP3 108 senses that the status of the medium becomes busy at the point 832 before the common downlink transmission starting time $T_{target-2}$ at time index 6. As a result, TP3 108 neither starts transmitting a burst over the medium at $T_{target-2}$ nor transmits a message to the CSMC 102 to indicate its burst length information. TP3 108 freezes the remaining value of its backoff counter. TP3 108, by default, attempts to perform next CCA 833 completing at the next starting time at time index 7, with a CW size corresponding with the remaining value of the backoff counter of TP3 108.

In response to messages 836 and 838 received from TP1 104 and TP2 106, respectively, the CSMC 102 determines a common $CW_3$ and a common staring point $T_{target-3}$, for example, $T_{target-3}=floor\{[max(t_{e12}, t_{e22})+DIFS+T+CW_3]/T\}$, and transmits the $t_{target-3}$ and $CW_3$ in a multi-cast message 840, such as a BAM, to TP1 104, TP2 106, and TP3 108. After the message 840 is received by the TPs, the TPs extract the common staring point $T_{target-3}$ and the common $CW_3$ from the message. As the TP3 108 receives the message at time point 834, which is before TP3 108 starts a CCA process at time index 7, the common staring point $t_{target-3}$ contained in the message 840 overrides the default starting time at time index 7. Therefore, TP3 108 does not perform CCA process during the period immediately before time index 7 with the remaining backoff counter value, but defers the CCA process 850 to the period immediately before the common staring point $t_{target\text{-}3}$, i.e., the time index 10. As well, with the extracted $CW_3$, each of the TPs 104, 106 and 108 sets its backoff counter value to correspond with $CW_3$ value. Based on the common staring point $t_{target\text{-}3}$ received from the CSMC 102, the TP3 108 determines its CCA starting time $t_{CCA\text{-}33}$, for example, $t_{CCA\text{-}33}=t_{target\text{-}3}-(DIFS+CW_3)$. Similarly, based on the common starting time $t_{target\text{-}3}$ and the common $CW_3$, the TP1 104 and TP2 106 determine their respective CCA starting time $t_{CCA\text{-}13}$ and $t_{CCA\text{-}23}$, for example, $t_{CCA\text{-}13}=t_{CCA\text{-}23}=t_{target\text{-}3}-(DIFS+CW_3)$. $t_{CCA\text{-}13}$, $t_{CCA\text{-}23}$ and $t_{CCA\text{-}33}$ are prior to $t_{target\text{-}3}$ in time and enable the TPs to complete the CCA processes at the burst transmission starting time $t_{target\text{-}3}$. "at" the burst transmission starting time leaves no time gap between the $t_{target\text{-}3}$ and the respective CCA process completing times of the TPs.

By not performing CCA processes during the periods between time index 7, 8, and 9, the TP3 108 saves power, and behaves less aggressively by not constantly sensing the medium during the periods from indices 7 to 9. As such, this unlicensed spectrum access scheme is fairer to the existing WLAN than the LBT proposed in Release 13 of the 3GPP. As well, during the period from time indices 7 to 9, TP1 104 keeps transmitting its burst 842. As such, even if TP3 108 kept performing CCA process 833 during this period, TP3 108 would sense that the medium is busy and CCA process 833 would not succeed. Therefore, it also is unnecessary for TP3 108 to perform CCA process 833 during the period from time indices 7 to 9. As such, this unlicensed spectrum access scheme is more efficient than the one proposed in Release 13 of 3GPP by not sensing the medium when other TPs are transmitting with the medium.

As shown in FIG. 8, TP3 108 performs the CCA process 846 during the period between time indices 9 and 10 with CCA starting time at $t_{CCA\text{-}33}$. As TP3 108 has set its backoff counter value to $CW_3$ value at the time point 834, the period of CCA process 846 comprises a DIFS period and a $CW_3$ period.

TP1 104 and TP2 106 then perform respective CCA processes during the CCA periods 846 and 848. TPs 104, 106 and 108 declare that the medium is busy before the common downlink transmission starting time $t_{target\text{-}3}$ at time index 10. As a result, TPs 104, 106 and 108 freeze the remaining values of the respective backoff counters and attempt to perform the respective CCA processes during the next period with the CCA process completing times at time index 11. As the CCA processes of TPs 104, 106 and 108 are not successful before the previous common starting time $t_{target\text{-}3}$ at time index 10, TPs 104, 106 and 108 do not transmit messages to the CSMC 102 to indicate any burst length information to be transmitted. As a result, the CSMC 102 does not transmit a message to indicate the next common downlink transmission starting time or a common CW value. Accordingly, TPs 104, 106, and 108 perform their respective CCA processes 852, 854 and 856 during the period between time indices 10 and 11, with the completing times of CCA processes at time index 11. In this case, the common downlink transmission starting time of the TPs becomes time index 11.

As the CCA process 846 of TP1 104 and CCA process 850 of TP3 108 are unsuccessful during the DIFS periods, their respective backoff counter values remain to be $CW_3$. As the CCA process 848 of TP2 106 is successful during the DIFS period but unsuccessful during the $CW_3$ period, the initial $CW_3$ value of its backoff counter has decreased and the remaining value of the backoff counter of TP2 106 is less than the $CW_3$. Therefore, the CCA process 854 is shorter than CCA processes 852 and 856.

As TP1 104 declares that the medium is busy prior to the common downlink burst transmission point at time index 11, by default, TP1 104 defers its CCA process to the next earliest period, with the CCA completing time at time index 12. TP1 104 does not transmit any message to CSMC 102 to indicate the length information of its burst to be transmitted.

Immediately before the common downlink transmission starting time at time index 11, at the end of the CCA processes 854 and 856, TP2 106 and TP3 108 respectively declare that the medium is idle and start transmitting respective downlink bursts 864 and 868 starting from the common time index 11. TP2 106 and TP3 108 determine the lengths of respective bursts 864 and 866, and thus the ending times $t_{e23}$ and $t_{e33}$. TP2 106 and TP3 108 transmit their burst lengths BL23 and BL33 information in respective messages 858 and 860 to the CSMC 102. The messages 858 and 860 may be NTS messages if TPS 104, 106, and 108 are LAA TPs.

The CSMC 102 determines a common $CW_5$. As the ending time $t_{e23}$ is between time indices 13 and 14 and as the ending time $t_{e33}$ is at time index 13, the CSMC 102 also determines that $T_{target\text{-}4}$ is at time index 14. For example, $T_{target\text{-}4}=\text{floor}\{[\max(t_{e23}, t_{e33})+DIFS+T+CW_5]/T\}$. The CSMC 102 then transmits the common $CW_5$ and the common downlink transmission starting time $t_{target\text{-}4}$ in a multicast message 862, such as a BAM, to the TP1 104, TP2 106, and TP3 108. After the message 862 is received by the TPs, the TPs extract the common staring point $T_{target\text{-}4}$ and the common $CW_5$ from the message. As TP1 104 receives the message 862 before it performs the deferred CCA process completing at time indices 12 and 13, $CW_5$ overrides the remaining value of the backoff counter of TP1 104, and TP1 104 further defers its CCA process 868 to the period between time indices 13 and 14 completing at $T_{target\text{-}4}$ at time index 14.

In absence of a CSMC 102 or in the case that the TPs 104, 106 and 108 are not grouped, the TPs 104, 106 and 108 in the example of FIG. 8 may autonomously fall back to a single TP operation mode as described above. Each of TPs 104, 106 and 108 may serve different set of UEs. Based on channel and interference conditions, each TP may detect different medium status. If the UEs served by the TP do not decode or respond to the TP in a single TP operation mode due to, for example, interference caused by hidden nodes, the TP may exercise time out, for example, by doubling the contention window size cws of the backoff counter, from which the CW value is generated.

In one embodiment, there is provided a transmission point (TP) for access to unlicensed spectrum. The TP comprises a processor configured to execute instructions that cause the TP to: perform, at the TP, a clear channel assessment (CCA) process starting at a CCA process starting time, the CCA process starting time enabling the CCA process to be completed at a downlink transmission starting time for transmitting a downlink burst, and transmit over the unlicensed spectrum, by the TP, the downlink burst starting at the downlink burst transmission starting time when the CCA process is successful.

In another embodiment, the processor is further configured to execute instructions that cause the TP to: transmit to the controller, by each of the TPs, a respective message indicating a respective first downlink burst transmission starting time of the TP, and align, by each of the TPs, to the common downlink burst transmission starting time which accommodates the respective first downlink burst transmission starting times of the TPs.

In another embodiment, the processor is further configured to execute instructions that cause the TP to: transmit to the controller, a second downlink transmission starting time.

In another embodiment, the downlink burst transmission starting time is determined by the system in accordance with a reference time received from the controller.

In another embodiment, the downlink burst transmission starting time is determined by the system in accordance with a downlink burst transmission completing time of the system.

In another embodiment, the TP receives from the controller a response message during the second CCA process or between a unlicensed spectrum busy time and the second CCA process starting time, and the TP deferring the second CAA process to a third CCA process starting time that will enable the TP to complete the second CCA process at a second starting time indicated in the response message.

In another embodiment, the processor is further configured to execute instructions that cause the TP to: delay a downlink burst transmission of the TP scheduled at the common downlink burst transmission starting time when the CCA process of the TP is not successful, and perform a second CCA process at a second CCA process starting time that will enable the TP to complete the second CCA process at a reference time.

In another embodiment, the processor is further configured to execute instructions that cause the TP to: after the unlicensed spectrum has been declared busy by the TP, receive from the controller, by the TP, in a response message a second common CW value and a second common downlink transmission starting time during the second CCA process or between a unlicensed spectrum busy indication and the second CCA starting time, set, by the TP, the backoff counter value as the second common CW value, and defer the second CAA process to a third CCA process starting time that will enable the TP to complete the second CCA process at a second starting time indicated in the response message.

In another embodiment, the processor is further configured to execute instructions that cause the TP to: receive from the controller a common contention window (CW) size value and a common downlink transmission starting time, set, at each of the TPs, a respective backoff counter value of the TP to respond with the common CW size value, and align to the common downlink burst transmission starting time.

In another embodiment, the processor is further configured to execute instructions that cause the TP to transmit, from each of the TPs to the controller, information of a length of the downlink burst.

In another embodiment, there is provided a controller for access to unlicensed spectrum. The controller comprises a processor configured to execute instructions that cause the controller to: transmit, by the controller, to each of the TPs, a common contention window (CW) size value and the common downlink transmission starting time, wherein each of the TPs is configured to: set a random backoff counter value to correspond with the common CW size value, align to the common downlink burst transmission starting time, perform, at each of the TPs, a respective clear channel assessment (CCA) process starting at a respective CCA process starting time, the respective CCA process starting time enabling the CCA process to be completed at a common downlink transmission starting time for transmitting a downlink burst, and transmit over the unlicensed spectrum, by each of the TP, the downlink burst starting at the common downlink burst transmission starting time when the CCA process is successful.

In another embodiment, the processor further configured to execute instructions that cause the controller to: transmit a common reference time to the TPs for the TPs to initiate respective CCA processes at the common reference time.

In another embodiment, the processor further configured to execute instructions that cause the controller to: receive, by the controller, length information of a downlink burst to be transmitted by each of the plurality of TPs, and transmit to the TPs, by the controller, a second common contention window (CW) size value and a second common downlink transmission starting time.

In another embodiment, there is provided a controller for access to unlicensed spectrum. The controller comprises a processor configured to execute instructions that cause the controller to: receive from each of the TPs, by the controller, a respective downlink burst transmission starting time, and transmit, by the controller, to each of the TPs, a common downlink burst transmission starting time, when the common downlink burst transmission starting time is different from the respective downlink burst transmission starting time, wherein each of the TPs is configured to: align the respective downlink burst transmission starting time to the common downlink burst transmission starting time, and perform, at each of the TPs, a respective clear channel assessment (CCA) process starting at a respective CCA process starting time, the respective CCA process starting time enabling the CCA process to be completed at a common downlink transmission starting time for transmitting a downlink burst, and transmit over the unlicensed spectrum, by each of the TPs, the downlink burst starting at the common downlink burst transmission starting time when the CCA process is successful.

In one embodiment, there is provided a method for access to unlicensed spectrum by one or more transmit points (TPs) associated with a controller, the method comprising: transmitting, to each of the TPs, a common downlink transmission starting time, wherein each of the TPs is configured to: transmit over the unlicensed spectrum, by each of the TPs, a respective downlink transmission starting at a downlink transmission starting time after a respective successful clear channel assessment (CCA) process of the at least one of the TPs, wherein each of the respective successful CCA process has a CCA process starting time enabling the respective successful CCA process to be completed at a common downlink transmission starting time.

In another embodiment, the method further comprising: transmitting, to each of the TPs, common contention window (CW) size value, the CW size value corresponding with a random contention duration of the CCA process of the TPs.

In another embodiment, the method further comprising: transmitting, by the controller, a common reference time to the TPs for the TPs to initiate respective CCA processes at the common reference time.

In another embodiment, the method further comprising: receiving, by the controller, length information of a downlink burst to be transmitted by each of the plurality of TPs, and transmitting to the TPs, by the controller, a second common contention window (CW) size value and a second common downlink transmission starting time.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

What is claimed is:

1. A method for downlink transmission via unlicensed spectrum by at least a first transmit point (TP) and a second TP, the method comprising:
   transmitting over a channel within the unlicensed spectrum, by the first TP, a first downlink transmission starting at a downlink transmission starting time upon determining that a first clear channel assessment (CCA) process has succeeded, the first CCA process starting after a first previous downlink transmission of the first TP and completing at the downlink transmission starting time; and
   transmitting over the channel, by the second TP, a second downlink transmission starting at the downlink transmission starting time upon determining that a second CCA process has succeeded, the second CCA process starting after a second previous downlink transmission of the second TP and completing at the downlink transmission starting time, the first previous downlink transmission and the second previous downlink transmission completing at different times, the first TP and the second TP coordinated by a controller to determine a same downlink transmission starting time.

2. The method of claim 1, wherein the first TP and the second TP are licensed assisted access (LAA) TPs, and wherein the downlink transmission starting time corresponds to a starting time of a licensed spectrum subframe.

3. The method of claim 1, further comprising:
   transmitting, by the first TP, a first message to the controller, the first message indicating a first proposed starting time; and
   transmitting, by the second TP, a second message to the controller, the second message indicating a second proposed starting time, wherein the downlink transmission starting time accommodates the first proposed starting time and the second proposed starting time.

4. The method of claim 3, wherein the first proposed starting time is determined in accordance with a completing time of the first previous downlink transmission and a duration of the first CCA process.

5. The method of claim 3, further comprising:
   receiving, by the first TP and the second TP, the downlink transmission starting time from the controller after the controller determines that the first proposed starting time is different from the second proposed starting time.

6. The method of claim 3, wherein the first proposed starting time and the second proposed starting time are the same, and wherein the first TP uses the first proposed starting time as the downlink transmission starting time and the second TP uses the second proposed starting time as the downlink transmission starting time in response to not receiving an indication from the controller within a period.

7. The method of claim 3, wherein the first message and the second message are transmitted to the controller with a delay.

8. The method of claim 3, wherein the first message and the second message are transmitted to the controller simultaneously.

9. The method of claim 1, further comprising:
   performing, by a third TP, a third CCA process, the third CCA process starting after a third previous downlink transmission of the third TP and completing before the downlink transmission starting time;
   performing, by the third TP, a fourth CCA process upon determining that the third CCA process has failed; and
   transmitting over the unlicensed spectrum, by the third TP, a third downlink transmission upon determining that the fourth CCA process has succeeded.

10. The method of claim 9, further comprising:
    freezing, by the third TP, a remaining value of a random backoff counter of the third CCA process, wherein the fourth CCA process has a duration that corresponds with the remaining value of the random backoff counter of the third CCA process.

11. The method of claim 10, wherein the fourth CCA process comprises a contention window (CW) size of the third TP, and wherein the CW size corresponds with the remaining value of the random backoff counter of the third CCA process.

12. The method of claim 1, wherein the first TP and the second TP are associated with the controller, the method further comprising: receiving, by the first TP and the second TP, the downlink transmission starting time from the controller.

13. The method of claim 12, the method further comprising:
    receiving, by the first TP, a first contention window (CW) size value from the controller, the first CW size value corresponding with a first random contention duration of the first CCA process; and receiving, by the second TP, a second CW size value from the controller, the second CW size value corresponding with a second random contention duration of the second CCA process.

14. The method of claim 12, further comprising:
transmitting, by the first TP, information of a length of the first downlink transmission to the controller; and
transmitting, by the second TP, information of a length of the second downlink transmission to the controller.

15. The method of claim 3, wherein the downlink transmission starting time is a maximum of the first proposed starting time and the second proposed starting time.

16. The method off claim 1, wherein the first TP and the second TP belong to a same group.

17. A method for access to an unlicensed spectrum by a first transmit point (TP) and a second TP associated with a controller, the method comprising:
receiving, by the controller, a first proposed starting time and a second proposed starting time from the first TP and the second TP respectively; and
transmitting, by the controller, a same downlink transmission starting time to the first TP and the second TP in response to determining that the first proposed starting time is different from the second proposed starting time, the first TP being configured to transmit a first downlink transmission over the unlicensed spectrum starting at the downlink transmission starting time upon determining that a first clear channel assessment (CCA) process has succeeded, the first CCA process starting after a first previous downlink transmission of the first TP and completing at the downlink transmission starting time; the second TP being configured to transmit a second downlink transmission over the unlicensed spectrum starting at the downlink transmission starting time upon determining a second CCA process has succeeded, the second CCA process starting after a second previous downlink transmission of the second TP and completing at the downlink transmission starting time, the first previous downlink transmission and the second previous downlink transmission completing at different times.

18. A first transmit point (TP) for access to unlicensed spectrum, the first TP comprising:
a non-transitory memory storage comprising instructions; and
one or more processors in communication with the non-transitory memory storage, wherein the one or more processors execute the instructions to:
transmit a first downlink transmission over a channel within the unlicensed spectrum starting at a downlink transmission starting time upon determining that a first clear channel assessment (CCA) process has succeeded, the first CCA process starting after a first previous downlink transmission of the first TP and completing at the downlink transmission starting time, wherein a second TP is configured to transmit a second downlink transmission over the channel starting at the downlink transmission starting time upon determining that a second CCA process has succeeded, the second CCA process starting after a second previous downlink transmission of the second TP and completing at the downlink transmission starting time, the first previous downlink transmission and the second previous downlink transmission completing at different times, the first TP and the second TP coordinated by a controller to determine a same downlink transmission starting time.

19. The first TP of claim 18, wherein the first TP is a licensed assisted access (LAA) TP, and wherein the downlink transmission starting time corresponds with a starting time of a licensed spectrum subframe.

20. A controller associated with a first transmit point (TP) and a second TP for the first TP and the second TP to access to unlicensed spectrum, the controller comprising:
a non-transitory memory storage comprising instructions; and
one or more processors in communication with the non-transitory memory storage, wherein the one or more processors execute the instructions to:
receive a first proposed starting time and a second proposed starting time from the first TP and the second TP respectively; and
transmit a same downlink transmission starting time to the first TP and the second TP in response to determining that the first proposed starting time is different from the second proposed starting time, the first TP being configured to transmit a first downlink transmission over the unlicensed spectrum starting at the downlink transmission starting time upon determining that a first clear channel assessment (CCA) process has succeeded, the first CCA process starting after a first previous downlink transmission and completing at the downlink transmission starting time; the second TP being configured to transmit a second downlink transmission over the unlicensed spectrum starting at the downlink transmission starting time upon determining a second CCA process has succeeded, the second CCA process starting after a second previous downlink transmission and completing at the downlink transmission starting time, the first previous downlink transmission and the second previous downlink transmission completing at different times.

21. The controller of claim 20, wherein the one or more processors further execute the instructions to:
transmit a first contention window (CW) size value to the first TP, the first CW size value corresponding with a first random contention duration of the first CCA process; and
transmit a second CW size value to the second TP, the second CW size value corresponding with a second random contention duration of the second CCA process.

* * * * *